(12) United States Patent
Yoshida et al.

(10) Patent No.: US 8,812,810 B2
(45) Date of Patent: Aug. 19, 2014

(54) MEMORY CONTROL APPARATUS

(75) Inventors: Akira Yoshida, Ota (JP); Osamu Fujimoto, Honjo (JP); Hideyuki Ochi, Kounosu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 229 days.

(21) Appl. No.: 12/964,566

(22) Filed: Dec. 9, 2010

(65) Prior Publication Data
US 2011/0138159 A1 Jun. 9, 2011

(30) Foreign Application Priority Data

Dec. 9, 2009 (JP) ................. 2009-279744

(51) Int. Cl.
*G06F 12/00* (2006.01)
*G06F 13/00* (2006.01)
*G06F 13/28* (2006.01)
*G06F 9/00* (2006.01)
*G06F 9/24* (2006.01)
*G06F 15/177* (2006.01)
*G06F 12/06* (2006.01)
*G06F 12/02* (2006.01)

(52) U.S. Cl.
CPC ............ *G06F 12/0684* (2013.01); *G06F 12/02* (2013.01); *G06F 12/0646* (2013.01)
USPC .............................. 711/170; 713/1

(58) Field of Classification Search
CPC .............................. G06F 12/02; G06F 12/0646
USPC ................................ 710/8; 711/170; 713/1
See application file for complete search history.

(56) References Cited

U.S. PATENT DOCUMENTS

| 5,287,472 A * | 2/1994 | Horst ...................... 365/189.08 |
| 5,740,404 A * | 4/1998 | Baji ............................... 711/167 |
| 5,838,610 A * | 11/1998 | Hashimoto .................. 365/168 |
| 6,631,459 B1 * | 10/2003 | Cho et al. ...................... 712/210 |
| 6,865,098 B1 * | 3/2005 | Ichiriu et al. ............... 365/49.15 |
| 2006/0090053 A1 * | 4/2006 | Boning ......................... 711/163 |
| 2008/0270713 A1 * | 10/2008 | Hornung et al. ............. 711/157 |

FOREIGN PATENT DOCUMENTS

JP 2006-253780 9/2006

OTHER PUBLICATIONS

Patent Abstracts of Japan for patent application with Publication No. 2006-253780, Publication Date: Sep. 21, 2006, 1 page.
Mechanical English translation of Japanese patent application with Publication No. 2006-253780, Publication Date: Sep. 21, 2006, 14 pages.

* cited by examiner

*Primary Examiner* — Farley Abad

(57) ABSTRACT

A memory control apparatus includes: a plurality of setting output units each configured to output setting information for setting operation of each of a plurality of memory cells; and a plurality of selection units each configured to select operation or stop of the operation of each of the plurality of memory cells in accordance with the setting information.

6 Claims, 23 Drawing Sheets

| SETTING REGISTER (MEMORY CELL CAPACITY) | MEMORY AREA SELECTION INFORMATION [MAS] | ADDRESS SPACE ASSIGNMENT INFORMATION [ASA] |
|---|---|---|
| #1 (1Kword) | 00 (PROGRAM MEMORY) | 0x0000 ~ 0x03FF |
| #2 (1Kword) | | 0x0400 ~ 0x07FF |
| #3 (1Kword) | | 0x0800 ~ 0x0BFF |
| #4 (1Kword) | | 0x0C00 ~ 0x0FFF |
| #5 (1Kword) | | 0x1000 ~ 0x13FF |
| #6 (1Kword) | 01 (DATA MEMORY #1) | 0x0000 ~ 0x03FF |
| #7 (1Kword) | | 0x0400 ~ 0x07FF |
| #8 (1Kword) | | 0x0800 ~ 0x0BFF |
| #9 (1Kword) | 10 (DATA MEMORY #2) | 0x0000 ~ 0x03FF |
| #10 (1Kword) | | 0x0400 ~ 0x07FF |
| #11 (1Kword) | | 0x0800 ~ 0x0BFF |
| #12 (1Kword) | | 0x0C00 ~ 0x0FFF |
| #13 (1Kword) | 11 (UNUSED AREA) | (N/A) |
| #14 (1Kword) | | (N/A) |
| #15 (1Kword) | | (N/A) |
| #16 (1Kword) | | (N/A) |

FIG. 9

| SETTING REGISTER (MEMORY CELL CAPACITY) | POWER-DOWN ASSIGNMENT INFORMATION [PDA] | MEMORY AREA SELECTION INFORMATION [MAS] | ADDRESS SPACE ASSIGNMENT INFORMATION [ASA] |
|---|---|---|---|
| #1 (1Kword) | 0 (IN USE) | 00 (PROGRAM MEMORY) | 0x0000~0x03FF |
| #2 (1Kword) | | | 0x0400~0x07FF |
| #3 (1Kword) | | | 0x0800~0x0BFF |
| #4 (1Kword) | | | 0x0C00~0x0FFF |
| #5 (1Kword) | | | 0x1000~0x13FF |
| #6 (1Kword) | | 01 (DATA MEMORY #1) | 0x0000~0x03FF |
| #7 (1Kword) | | | 0x0400~0x07FF |
| #8 (1Kword) | | | 0x0800~0x0BFF |
| #9 (1Kword) | | 10 (DATA MEMORY #2) | 0x0000~0x03FF |
| #10 (1Kword) | | | 0x0400~0x07FF |
| #11 (1Kword) | | | 0x0800~0x0BFF |
| #12 (1Kword) | | | 0x0C00~0x0FFF |
| #13 (1Kword) | 1 (UNUSED/ POWER-DOWN [PD]) | (N/A) | (N/A) |
| #14 (1Kword) | | | (N/A) |
| #15 (1Kword) | | | (N/A) |
| #16 (1Kword) | | | (N/A) |

FIG. 11

| MEMORY AREA ASSIGNMENT INFORMATION [MAA1] | MEMORY AREA ASSIGNMENT INFORMATION [MAA2] | MEMORY AREA ASSIGNMENT INFORMATION [MAA3] |
| --- | --- | --- |
| 0x1400 (PROGRAM MEMORY: 5K WORD) | 0x0C00 (DATA MEMORY #1: 3K WORD) | 0x1000 (DATA MEMORY #2: 4K WORD) |

FIG. 14

| SETTING DECODER (MEMORY CELL CAPACITY) | ADDRESS SUBTRACTION VALUE [ASV] | NEXT CELL START ADDRESS INFORMATION [NSA] | MEMORY AREA SELECTION INFORMATION [MAS] | ADDRESS SPACE ASSIGNMENT INFORMATION [ASA] |
|---|---|---|---|---|
| #1 (0x0400) | MAA1−0x0400 =0x1000 | 0+0x0400 =0x0400 | 00 (PROGRAM MEMORY) | 0x0000 ~0x03FF |
| #2 (0x0400) | 0x1000−0x0400 =0x0C00 | 0x0400+0x0400 =0x0800 | | 0x0400 ~0x07FF |
| #3 (0x0400) | 0x0C00−0x0400 =0x0800 | 0x0800+0x0400 =0x0C00 | | 0x0800 ~0x0BFF |
| #4 (0x0400) | 0x0800−0x0400 =0x0400 | 0x0C00+0x0400 =0x1000 | | 0x0C00 ~0x0FFF |
| #5 (0x0400) | 0x0400−0x0400 =0 (ASSIGNMENT FINISHED) | 0x1000+0x0400 =0x1400 | | 0x1000 ~0x13FF |
| #6 (0x0400) | MAA2−0x0400 =0x0800 | 0+0x0400 =0x0400 | 01 (DATA MEMORY #1) | 0x0000 ~0x03FF |
| #7 (0x0400) | 0x0800−0x0400 =0x0400 | 0x0400+0x0400 =0x0800 | | 0x0400 ~0x07FF |
| #8 (0x0400) | 0x0400−0x0400 =0 (ASSIGNMENT FINISHED) | 0x0800+0x0400 =0x0C00 | | 0x0800 ~0x0BFF |
| #9 (0x0400) | MAA3−0x0400 =0x0C00 | 0+0x0400 =0x0400 | 10 (DATA MEMORY #2) | 0x0000 ~0x03FF |
| #10 (0x0400) | 0x0C00−0x0400 =0x0800 | 0x0400+0x0400 =0x0800 | | 0x0400 ~0x07FF |
| #11 (0x0400) | 0x0800−0x0400 =0x0400 | 0x0800+0x0400 =0x0C00 | | 0x0800 ~0x0BFF |
| #12 (0x0400) | 0x0400−0x0400 =0 (ASSIGNMENT FINISHED) | 0x0C00+0x0400 =0x1000 | | 0x0C00 ~0x0FFF |
| #13 (0x0400) | (N/A) | (N/A) | 11 (UNUSED AREA) | (N/A) |
| #14 (0x0400) | (N/A) | (N/A) | | (N/A) |
| #15 (0x0400) | (N/A) | (N/A) | | (N/A) |
| #16 (0x0400) | (N/A) | (N/A) | | (N/A) |

FIG. 15

| SETTING REGISTER (MEMORY CELL CAPACITY) | CPU ASSIGNMENT INFORMATION [CPA] | MEMORY AREA SELECTION INFORMATION [MAS] | ADDRESS SPACE ASSIGNMENT INFORMATION [ASA] |
|---|---|---|---|
| #1 (1Kword) | 0 (CPU #1) | 00 (PROGRAM MEMORY) | 0x0000~0x03FF |
| #2 (1Kword) | | | 0x0400~0x07FF |
| #3 (1Kword) | | | 0x0800~0x0BFF |
| #4 (1Kword) | | | 0x0C00~0x0FFF |
| #5 (1Kword) | | | 0x1000~0x13FF |
| #6 (1Kword) | | 01 (DATA MEMORY #1) | 0x0000~0x03FF |
| #7 (1Kword) | | | 0x0400~0x07FF |
| #8 (1Kword) | | | 0x0800~0x0BFF |
| #9 (1Kword) | | 10 (DATA MEMORY #2) | 0x0000~0x03FF |
| #10 (1Kword) | | | 0x0400~0x07FF |
| #11 (1Kword) | | | 0x0800~0x0BFF |
| #12 (1Kword) | | | 0x0C00~0x0FFF |
| #13 (1Kword) | (N/A) | 11 (UNUSED AREA) | (N/A) |
| #14 (1Kword) | | | (N/A) |
| #15 (1Kword) | | | (N/A) |
| #16 (1Kword) | | | (N/A) |
| #17 (1Kword) | | | (N/A) |
| #18 (1Kword) | | | (N/A) |
| #19 (1Kword) | 1 (CPU #2) | 00 (PROGRAM MEMORY) | 0x0000~0x03FF |
| #20 (1Kword) | | | 0x0400~0x07FF |
| #21 (1Kword) | | | 0x0800~0x0BFF |
| #22 (1Kword) | | | 0x0C00~0x0FFF |
| #23 (1Kword) | | | 0x1000~0x13FF |
| #24 (1Kword) | | 01 (DATA MEMORY #1) | 0x0000~0x03FF |
| #25 (1Kword) | | | 0x0400~0x07FF |
| #26 (1Kword) | | | 0x0800~0x0BFF |
| #27 (1Kword) | | 10 (DATA MEMORY #2) | 0x0000~0x03FF |
| #28 (1Kword) | | | 0x0400~0x07FF |
| #29 (1Kword) | | | 0x0800~0x0BFF |
| #30 (1Kword) | | | 0x0C00~0x0FFF |

FIG. 19

| MEMORY AREA | SETTING REGISTER (MEMORY CELL CAPACITY) | POWER-DOWN ASSIGNMENT INFORMATION [PDA] | ADDRESS SPACE ASSIGNMENT INFORMATION [ASA] |
|---|---|---|---|
| PROGRAM MEMORY | #1 (1Kword) | 0 (IN USE) | 0x0000~0x03FF |
| | #2 (1Kword) | | 0x0400~0x07FF |
| | #3 (1Kword) | | 0x0800~0x0BFF |
| | #4 (1Kword) | | 0x0C00~0x0FFF |
| | #5 (1Kword) | | 0x1000~0x13FF |
| | #6 (1Kword) | 1 (UNUSED/ POWER-DOWN [PD]) | (N/A) |
| | #7 (1Kword) | | (N/A) |
| | #8 (1Kword) | | (N/A) |
| DATA MEMORY #1 | #9 (1Kword) | 0 (IN USE) | 0x0000~0x03FF |
| | #10 (1Kword) | | 0x0400~0x07FF |
| | #11 (1Kword) | | 0x0800~0x0BFF |
| | #12 (1Kword) | 1 (UNUSED/ POWER-DOWN [PD]) | (N/A) |
| | #13 (1Kword) | | (N/A) |
| | #14 (1Kword) | | (N/A) |
| | #15 (1Kword) | | (N/A) |
| | #16 (1Kword) | | (N/A) |
| DATA MEMORY #2 | #17 (1Kword) | 0 (IN USE) | 0x0000~0x03FF |
| | #18 (1Kword) | | 0x0400~0x07FF |
| | #19 (1Kword) | | 0x0800~0x0BFF |
| | #20 (1Kword) | | 0x0C00~0x0FFF |
| | #21 (1Kword) | 1 (UNUSED/ POWER-DOWN [PD]) | (N/A) |
| | #22 (1Kword) | | (N/A) |
| | #23 (1Kword) | | (N/A) |
| | #24 (1Kword) | | (N/A) |

FIG. 24

MEMORY CONTROL APPARATUS

CROSS-REFERENCE TO RELATED APPLICATION

This application claims the benefit of priority to Japanese Patent Application No. 2009-279744, filed Dec. 9, 2009, of which full contents are incorporated herein by reference.

BACKGROUND OF THE INVENTION

1. Field of the Invention

The present invention relates to a memory control apparatus.

2. Description of the Related Art

In these years, a processor is mounted on many electronic devices. For example, Japanese Patent Laid-Open Publication No. 2006-253780 discloses an audio system in which a DSP (Digital Signal Processor) is mounted in addition to a radio tuner. In this audio system, a speech signal extracted by the radio tuner is subjected to digital signal processing in the DSP, and then is output as voice.

Also, electronic devices incorporating computer systems called built-in systems or embedded systems have been widespread. In such an electronic device, a CPU (Central Processing Unit) which is configured as a microprocessor is mounted, and the CPU executes various numerical calculations, information processing, device control, and the like according to programs.

The electronic device provided with a processor can flexibly support change to a specification by changing software even after design of hardware is completed. Therefore, products in accordance with customer needs can be supplied at appropriate timing. Further, even after the product is shipped, addition of a function in accordance with customer needs can easily be realized by change of software.

Here, an example of a general connection relationship between the processor mounted on the electronic device as above and memory is illustrated in FIG. 26. In FIG. 26, memory 3 to 5 is connected to a CPU 8, which is a processor. Also, similarly to FIG. 2 in Japanese Patent Laid-Open Publication No. 2006-253780, Harvard architecture with separate program memory and data memory is employed, and the memory 3 is used as the program memory, while the memory 4 and 5 are used as data memory #1 and data memory #2, respectively.

In such a configuration, if the design of the software is completed after the design of the hardware, as illustrated in FIG. 26, for example, a portion of each of the memory might result in an unused area. Also, even if the unused area of the memory can be minimized before shipment of the product, it might be desirable to leave the unused area so that a function can be added after the shipment of the product.

However, if the unused area remains in the memory, it is required to use memory with a capacity larger than the requisite minimum capacity. Thus, current consumption of each memory may be increased.

SUMMARY OF THE INVENTION

A memory control apparatus according to an aspect of the present invention, includes: a plurality of setting output units each configured to output setting information for setting operation of each of a plurality of memory cells; and a plurality of selection units each configured to select operation or stop of the operation of each of the plurality of memory cells in accordance with the setting information.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 9 is a diagram illustrating an example of setting information to be downloaded to each setting register according to a first embodiment of the present invention;

FIG. 11 is a diagram illustrating another example of setting information to be downloaded to each setting register according to a first embodiment of the present invention;

FIG. 14 is a diagram illustrating an example of memory area designation information to be downloaded to a setting decoder according to a second embodiment of the present invention;

FIG. 15 is a diagram for describing a method by which each setting decoder calculates setting information from memory area designation information illustrated in FIG. 14;

FIG. 19 is a diagram illustrating an example of setting information to be downloaded to each setting register according to a third embodiment of the present invention;

FIG. 24 is a diagram illustrating an example of setting information to be downloaded to each setting register according to a fourth embodiment of the present invention;

DETAILED DESCRIPTION OF THE INVENTION

At least the following details will become apparent from descriptions of this specification and of the accompanying drawings.

First Embodiment

===Outline of Configuration of Memory Control Apparatus===

An outline of a configuration of a memory control apparatus according to a first embodiment of the present invention will be described below referring to FIG. 1.

Figure 1:
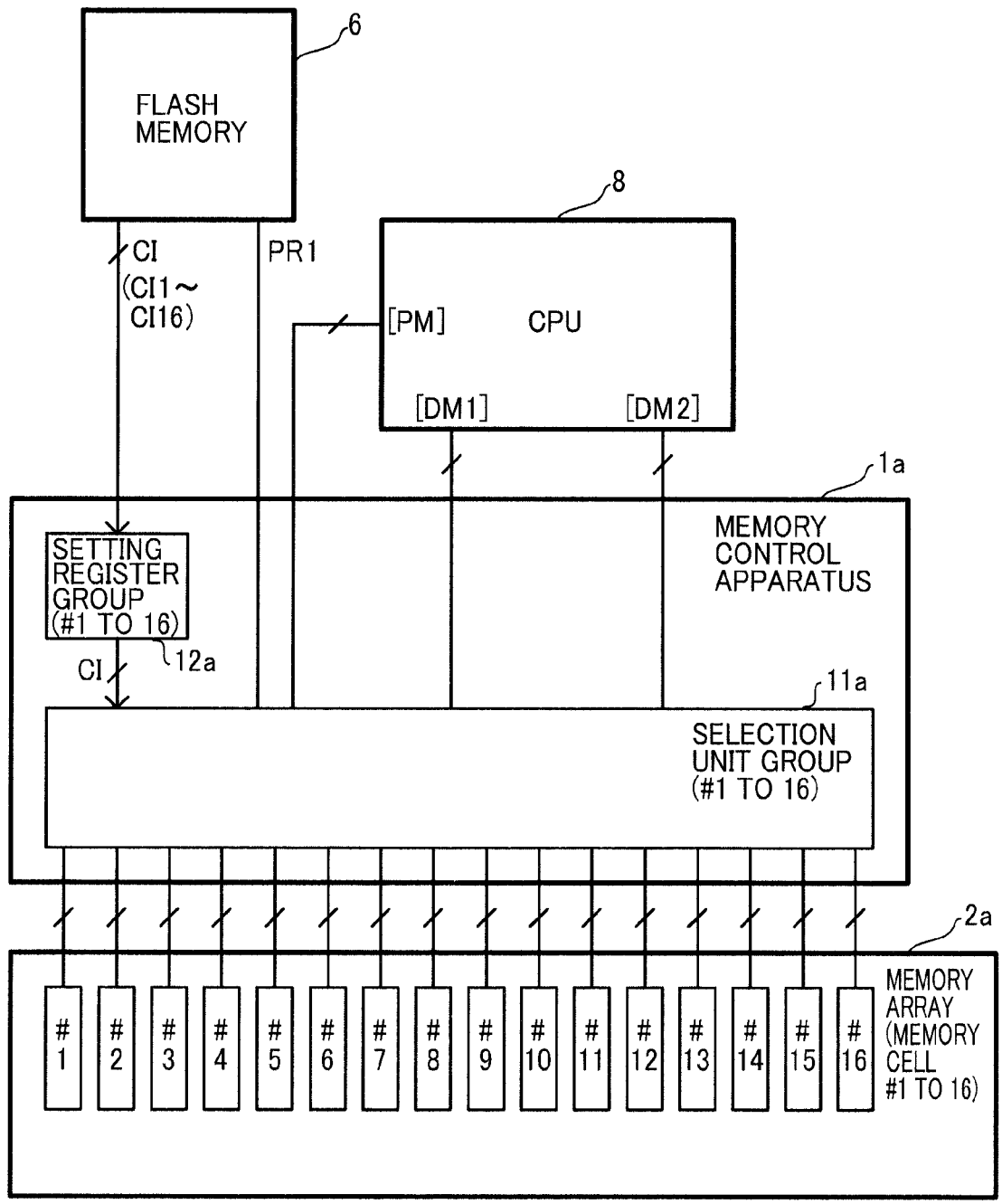
FIG. 1 is a block diagram illustrating an outline and an application example of a configuration of a memory control apparatus according to a first embodiment of the present invention.

A memory control apparatus 1a illustrated in FIG. 1 is an apparatus that controls a memory array 2a including a plurality of memory cells and includes a selection unit group 11a and a setting register group 12a. Also, FIG. 1 illustrates an example of the application of the memory control apparatus 1a, wherein the memory control apparatus 1a is used with a flash memory 6 and a CPU 8 in addition to the memory array 2a. In an embodiment of the present invention, the setting register group 12a corresponds to a plurality of setting output units and a plurality of storage units.

In an embodiment of the present invention, as an example, it is assumed that the memory array 2a includes 16 memory cells, and hereinafter, as illustrated in FIG. 1, each of the memory cells is referred to as a memory cell #1 (or #2-#16), for example.

The selection unit group 11a includes 16 selection units that correspond to the memory cells, respectively, and hereinafter, each of the selection units is referred to as a selection unit #1 (or #2-#16) in association with each of the memory cells. Further, the selection unit group 11a and the memory array 2a are connected to each other by signal lines for controlling the memory cells. A control signal of a memory cell will be described later in detail.

The setting register group 12a includes 16 setting registers that correspond to the selection units and the memory cells, respectively, and hereinafter, each of the setting registers is referred to as a setting register #1 (or #2-#16) in association with each of the memory cells. Also, setting information CI (CI1 to CI16) for setting an operation of each of the memory cells is inputted from the setting register group 12a to the selection unit group 11a. The setting information CI will be described later in detail.

Figure 26:
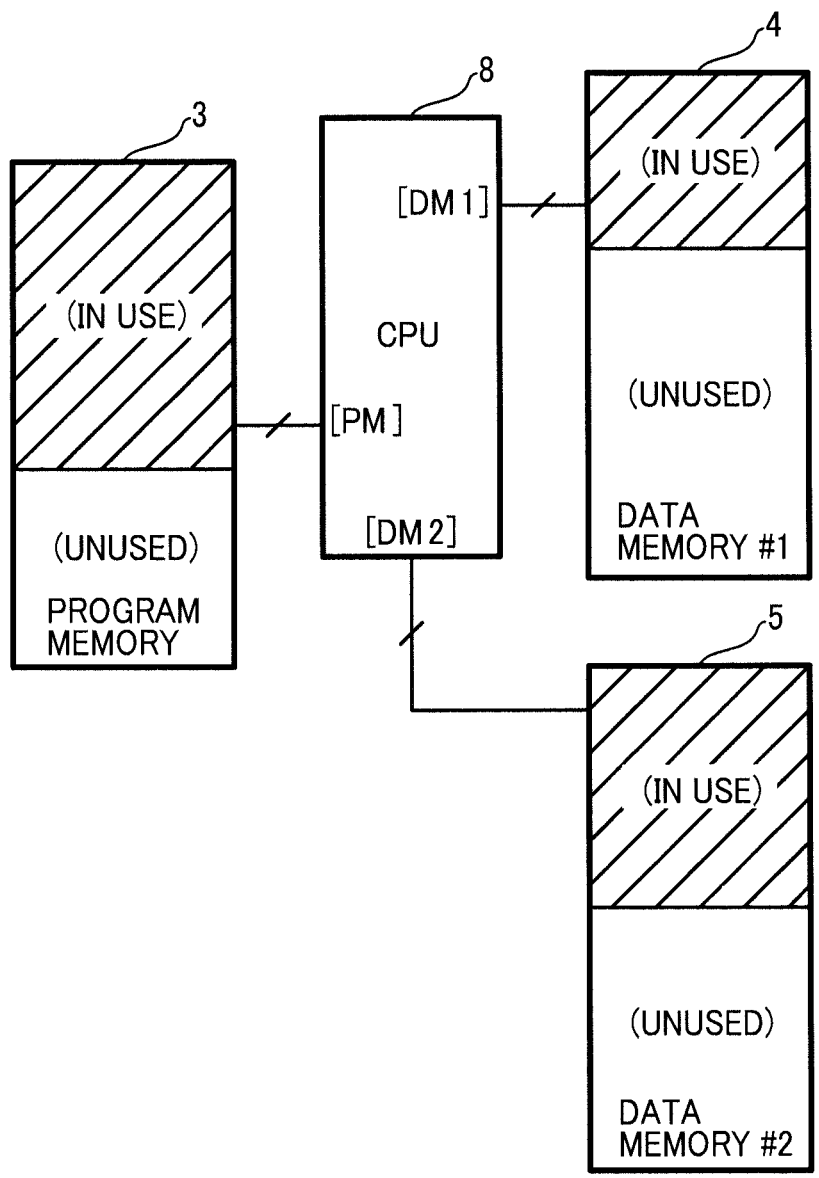
FIG. 26 is a diagram illustrating an example of a general connection relationship between a processor and a memory, and a usage state of each memory.

The CPU 8 employs the Harvard architecture and uses three memory areas corresponding to a program memory, data memory #1, and the data memory #2, as in the case of FIG. 26. The signal lines for controlling memory areas are all connected to the selection unit group 11a. The control signal for the memory areas will be described later in detail.

The flash memory 6 is connected to the selection unit group 11a and the setting register group 12a.

===Outline of Operation of Memory Control Apparatus===

Subsequently, an outline of an operation of the memory control apparatus according to an embodiment of the present invention will be described.

In the flash memory 6, the setting information CI and a program PR1 are stored. In the flash memory 6, a boot loader (bootstrap loader) is also stored, and by means of the boot loader, the setting information CI is downloaded to each of the setting registers and stored therein, before the CPU 8 starts an actual operation after reset or the like. Further, each of the selection units selects operation or stop of the operation of each of the memory cells, or selects a memory area to which each of the memory cells is assigned, in accordance with the setting information which is stored in each of the setting registers. Then, the boot loader downloads the program PR1 to the memory cell that is assigned to the program memory, and the CPU 8 starts executing the program PR1.

As described above, the selection unit group 11a selects operation of the memory cells and selects the memory area in accordance with the setting information CI stored in the setting register group 12a. Then, in accordance with such selection, the CPU 8 can use the memory array 2a as the program memory, the data memory #1, and the data memory #2.

===Configuration of Selection Unit and Setting Register===

In the memory control apparatus in an embodiment of the present invention, the configurations of the selection unit #1 and the setting register #1 corresponding to the memory cell #1 will be described below referring to FIGS. 2 to 8. It is assumed that the selection units #2 to #16 and the setting registers #2 to #16 have the configurations similar to those of the selection unit #1 and the setting register #1.

Figure 2:
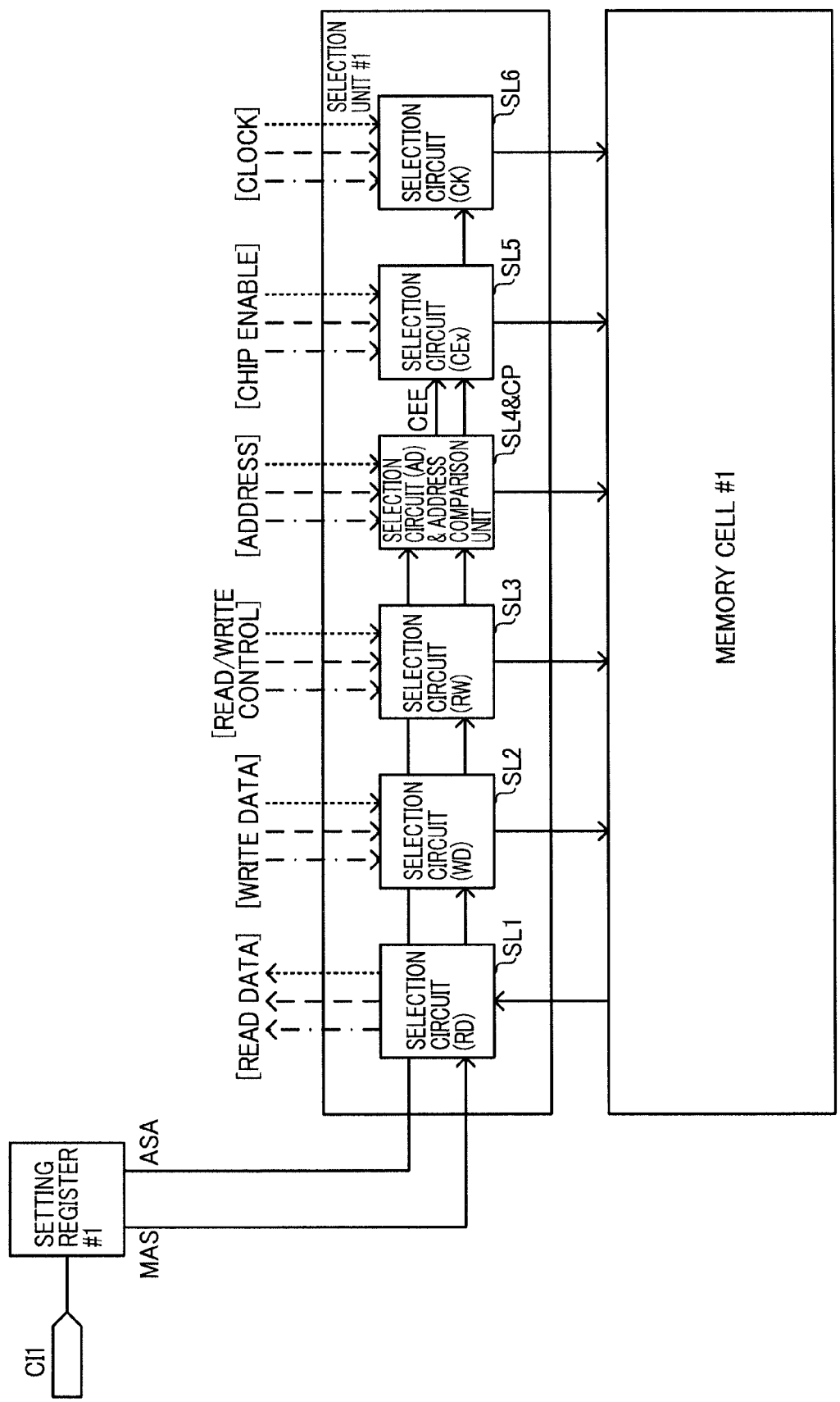
FIG. 2 is a block diagram illustrating configurations of a selection unit #1 corresponding to a memory cell #1 and a setting register #1 according to a first embodiment of the present invention.

As illustrated in FIG. 2, the setting information CI1 for setting the operation of the memory cell #1 is inputted (downloaded), to the setting register #1. Also, in an embodiment of the present invention, the setting information CI1 includes memory area selection information MAS and address space assignment information ASA, and is inputted from the setting register #1 to the selection unit #1. The selection unit #1 includes selection circuits SL1 to SL6 and an address comparison unit CP.

In the following explanation, as an example, it is assumed that the memory area selection information MAS is a 2-bit value and expressed in binary notation, and the address space assignment information ASA is a 16-bit value and expressed in hexadecimal notation.

Figure 4:
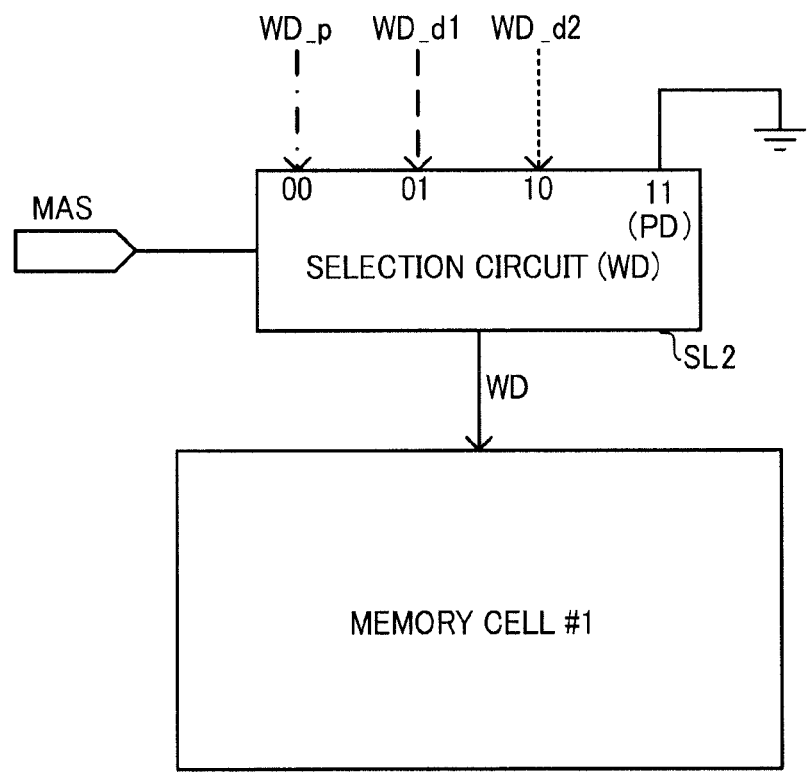
FIG. 4 is a block diagram illustrating an example of a specific configuration of a selection circuit corresponding to write data according to a first embodiment of the present invention.
Figure 5:
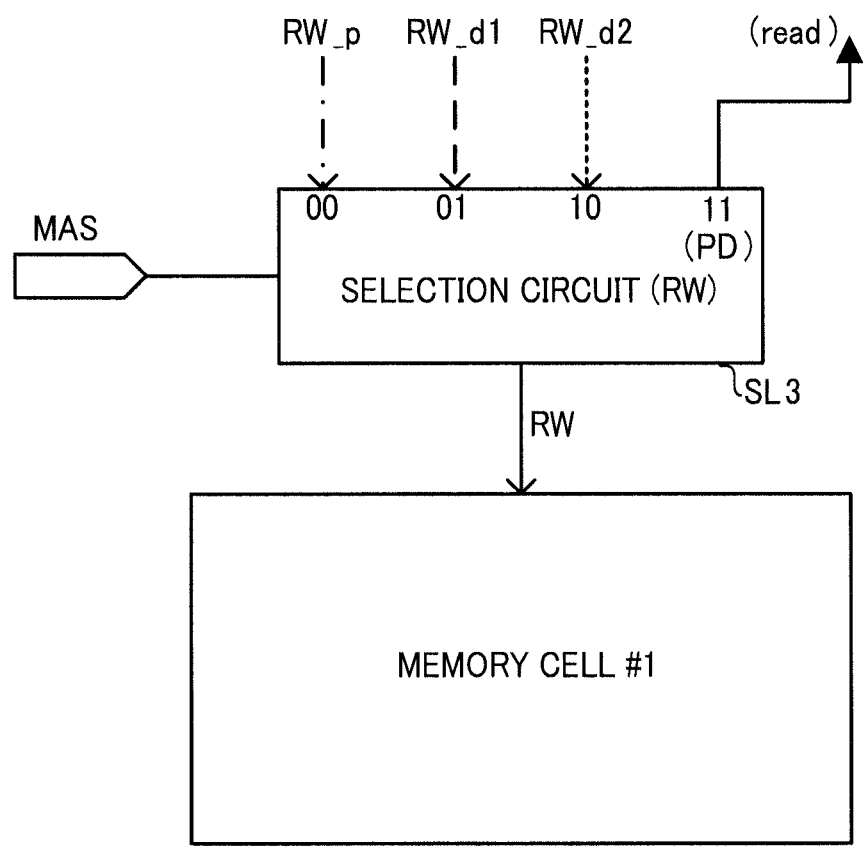
FIG. 5 is a block diagram illustrating an example of a specific configuration of a selection circuit corresponding to read/write control signal according to a first embodiment of the present invention.
Figure 6:
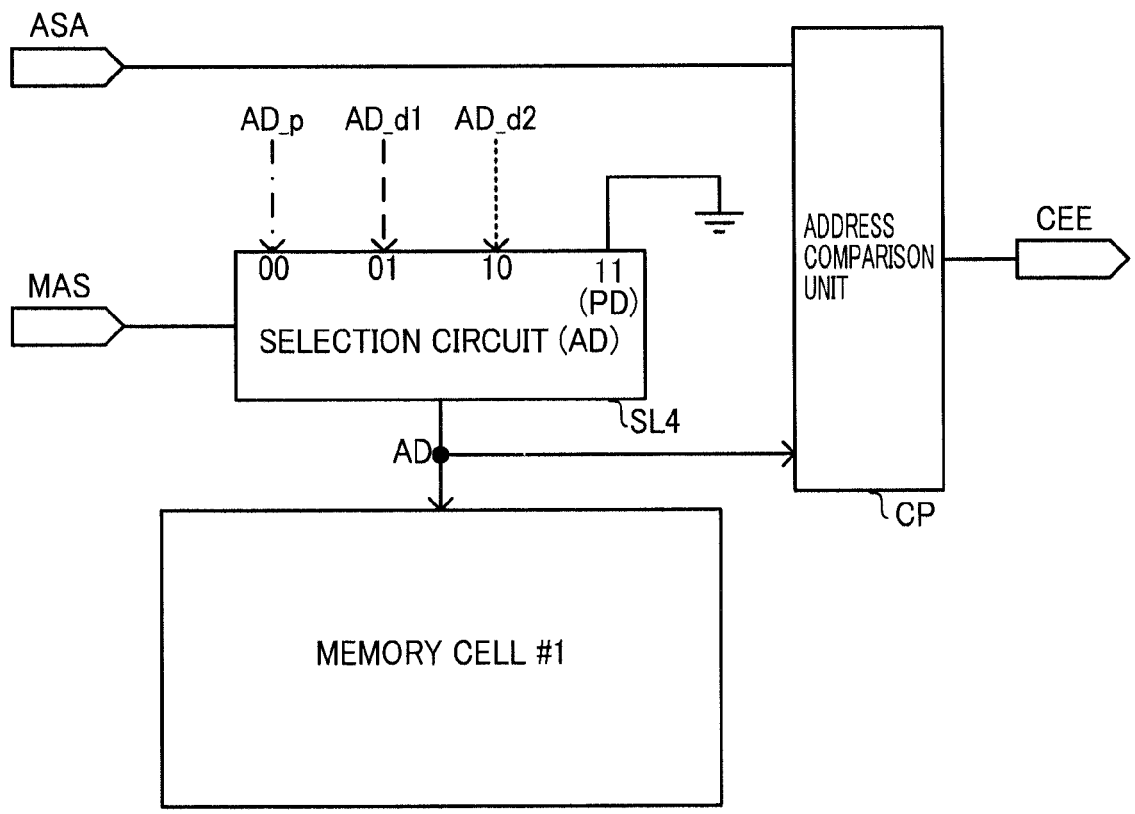
FIG. 6 is a block diagram illustrating an example of a specific configuration of a selection circuit and an address comparison unit corresponding to address information according to a first embodiment of the present invention.

In FIGS. 3 to 8, examples of specific configurations of the selection circuits SL1 to SL6 are illustrated, respectively, wherein the address comparison unit CP is illustrated in FIG. 6. Also, in FIGS. 3 to 8, a signal to be inputted/outputted between each of the selection circuits and the memory cell #1 is indicated by a solid line. Further, signals to be inputted/outputted between each of the selection circuits and the CPU 8, which are indicated by a dashed-dotted line, a long-dashed line, and a short-dashed line, correspond to the program memory, the data memory #1, and the data memory #2, respectively. And the signals corresponding to the program memory, the data memory #1, and the data memory #2 are expressed with "_p", "_d1", and "_d2" added to the signals inputted/outputted with respect to the memory cell #1, respectively.

Figure 3:
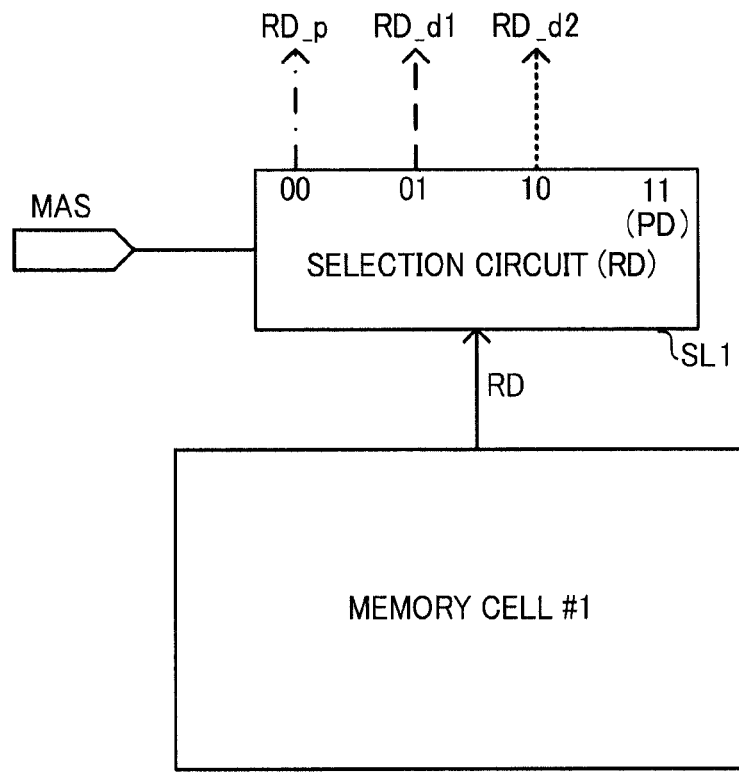
FIG. 3 is a block diagram illustrating an example of a specific configuration of a selection circuit corresponding to read data according to a first embodiment of the present invention.

As illustrated in FIG. 3, the selection circuit SL1 is configured as a demultiplexer with one input and four outputs, and the memory area selection information MAS is inputted to the selection control input of the circuit. Also, read data RD is inputted to the data input thereof from the memory cell #1. Further the read data RD_p, RD_d1, and RD_d2 are outputted from the outputs corresponding to MAS=00, 01, and 10, respectively, and the output corresponding to MAS=11 is NC (No connection). The read data RD_p, RD_d1, and RD_d2 are inputted to the CPU 8 as read data of the program memory, the data memory #1, and the data memory #2, respectively.

As illustrated in FIG. 4, the selection circuit SL2 is configured as a multiplexer with four inputs and one output, and the memory area selection information MAS is inputted to the selection control input of the circuit. Also the write data WD_p, WD_d1, and WD_d2 are inputted to the data inputs thereof corresponding to MAS=00, 01, and 10, respectively, and the data input thereof corresponding to MAS=11 is fixed to a low level. The write data WD outputted from the selection circuit SL2 is inputted to the memory cell #1.

As illustrated in FIG. 5, the selection circuit SL3 is configured as a multiplexer with four inputs and one output, and the memory area selection information MAS is inputted to the selection control input of the circuit. Also the read/write control signal RW_p, RW_d1, and RW_d2 are inputted to the data inputs thereof corresponding to MAS=00, 01, and 10, respectively, and the data input thereof corresponding to MAS=11 is fixed to a high level. The read/write control signal RW outputted from the selection circuit SL3 is inputted to the memory cell #1.

As illustrated in FIG. 6, the selection circuit SL4 is configured as a multiplexer with four inputs and one output, and the memory area selection information MAS is inputted to the selection control input of the circuit. Also the address information AD_p, AD_d1, and AD_d2 are inputted to the data inputs thereof corresponding to MAS=00, 01, and 10, respectively, and the data input thereof corresponding to MAS=11 is fixed to a low level. And the address information AD outputted from the selection circuit SL4 is inputted to the memory cell #1 and the address comparison unit CP.

The address space assignment information ASA is also inputted to the address comparison unit CP, and a CE enable signal ("chip enable" enable signal) CEE is outputted from the address comparison unit CP.

Figure 7:
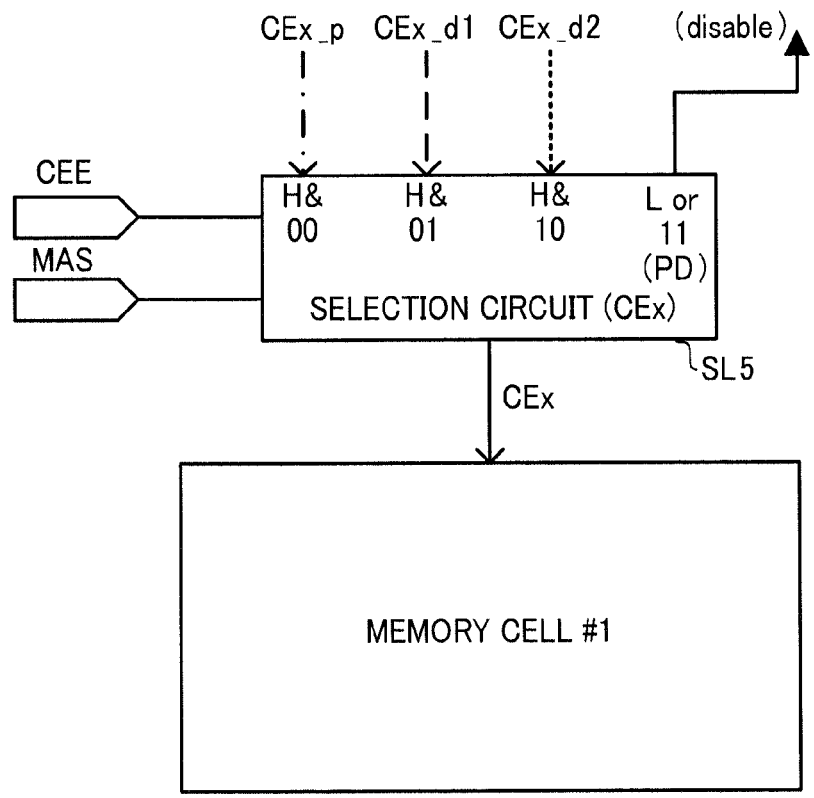
FIG. 7 is a block diagram illustrating an example of a specific configuration of a selection circuit corresponding to a chip enable signal according to a first embodiment of the present invention.

As illustrated in FIG. 7, the selection circuit SL5 is configured as a multiplexer with four inputs and one output, and the CE enable signal CEE and the memory area selection information MAS are inputted to the selection control input of the circuit. Also, if the CE enable signal CEE is high, the chip enable signals CEx_p, CEx_d1, and CEx_d2 are inputted to the data inputs thereof corresponding to MAS=00, 01, and 10, respectively. If the CE enable signal CEE is low or the data input thereof corresponding to MAS=11 is fixed to a high level. And the chip enable signal CEx outputted from the selection circuit SL5 is inputted to the memory cell #1.

Figure 8:
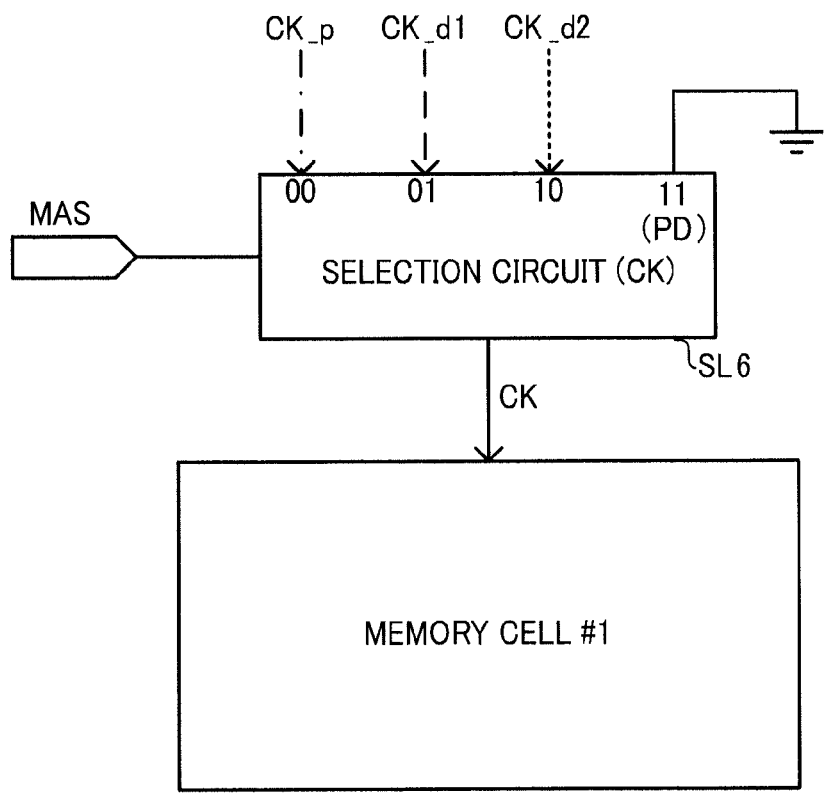
FIG. 8 is a block diagram illustrating an example of a specific configuration of a selection circuit corresponding to a clock signal according to a first embodiment of the present invention.

As illustrated in FIG. 8, the selection circuit SL6 is configured as a multiplexer with four inputs and one output, and the memory area selection information MAS is inputted to the selection control input of the circuit. Also the clock signals CK_p, CK_d1, and CK_d2 are inputted to the data inputs thereof corresponding to MAS=00, 01, and 10, respectively, and the data input thereof corresponding to MAS=11 is fixed to the low level. And the clock signal CK outputted from the selection circuit SL6 is inputted to the memory cell #1.

===Operation of Selection Unit===

Subsequently, an operation of the selection unit #1 according to an embodiment of the present invention will be described. In an embodiment of the present invention, the read/write control signal becomes in a reading mode if it is high, while the signal becomes in a writing mode if it is low. Also, the chip enable signal is disabled if it is high, and is enabled if it is low.

As described above, the memory area selection information MAS is inputted to all the selection control inputs of the selection circuits SL1 to SL6. Thus, descriptions will be separately given according to a value of the memory area selection information MAS in the following.

In a case of MAS=00, the selection unit #1 assigns the memory cell #1 to the program memory. Specifically, the read data RD, which is inputted from the memory cell #1 to the selection circuit SL1, is inputted to the CPU 8 as the read data RD_p of the program memory. The selection circuits SL2 to SL6 select the write data WD_p, the read/write control signal RW_p, the address information AD_p, the chip enable signal CEx_p, and the clock signal CK_p of the program memory, respectively, and input them to the memory cell #1.

In a case of MAS=01, the selection unit #1 assigns the memory cell #1 to the data memory #1. Specifically, the read data RD, which is inputted from the memory cell #1 to the selection circuit SL1, is inputted to the CPU 8 as the read data RD_d1 of the data memory #1. The selection circuits SL2 to SL6 select the write data WD_d1, the read/write control signal RW_d1, the address information AD_d1, the chip enable signal CEx_d1, and the clock signal CK_d1 of the data memory #1, respectively, and input them to the memory cell #1.

In a case of MAS=10, the selection unit #1 assigns the memory cell #1 to the data memory #2. Specifically, the read data RD, which is inputted from the memory cell #1 to the selection circuit SL1, is inputted to the CPU 8 as the read data RD_d2 of the data memory #2. The selection circuits SL2 to SL6 select the write data WD_d2, the read/write control signal RW_d2, the address information AD_d2, the chip enable signal CEx_d2, and the clock signal CK_d2 of the data memory #2, respectively, and input them to the memory cell #1.

The address comparison unit CP sets the CE enable signal CEE at a high level, only if the value of the address information AD inputted to the memory cell #1 is included in a range of the address determined in accordance with the address space assignment information ASA. Therefore, if the value of the address information AD is not included in the range of the address, the CE enable signal CEE becomes low, and regardless of the value of the memory area selection information MAS, the chip enable signal CEx becomes high. While the chip enable signal CEx is high, the operation of the memory cell #1 is stopped. More specifically, in the memory cell #1, operations of a sense amplifier circuit, an address decoder circuit and the like provided inside thereof are stopped.

In a case of MAS=11, the selection unit #1 assigns the memory cell #1 to the unused area. Specifically, the read data RD, which is inputted from the memory cell #1 to the selection circuit SL1, is not inputted to the CPU 8, and the write data WD inputted to the memory cell #1 is fixed to the low level. Also, the read/write control signal inputted to the memory cell #1 is fixed to the reading mode, and the value of the address information AD is fixed to 0.

Further, since the chip enable signal CEx inputted to the memory cell #1 is fixed to a disable state, the sense amplifier circuit, the address decoder circuit and the like in the memory cell #1 are not operated. Since the clock signal CK inputted to the memory cell #1 is fixed to the low level, such elements as a clock buffer, DFF (D-type flip-flop), and the like in the memory cell #1 are not operated. Therefore, current consumption of the memory cell #1 in the case where the cell is assigned to the unused area is drastically reduced.

===Example of Setting Information===

Here, an example of the setting information CI to be downloaded to the setting registers #1 to #16 is illustrated in FIG. 9. In FIG. 9, the capacity of each memory cell is set to 1K word (=1024 words), but memory cells with different capacities may be mixed.

The memory area selection information MAS is used for selecting the memory area to which the memory cell is assigned in each selection unit. As illustrated in FIG. 9, according to the memory area selection information MAS, the memory cells #1 to #5 are assigned to the program memory, the memory cells #6 to #8 are assigned to the data memory #1, and the memory cells #9 to #12 are assigned to the data memory #2, respectively. Also, the memory cells #13 to #16 are assigned to the unused area.

The address space assignment information ASA is used for assigning the address space of each of the memory areas other than the unused area. As illustrated in FIG. 9, the address space is assigned in accordance with the address space assignment information ASA, and the capacities of the program memory, the data memory #1, and the data memory #2 are set to 5K words, 3K words, and 4K words, respectively. Also, the address space assignment information ASA corresponding to the memory cells #13 to #16, which are assigned to the unused area, is not used.

In FIG. 9, the address space assignment information ASA indicates a start address and an end address of each memory cell. In this case, the address comparison unit CP allows the CE enable signal CEE to become high, only if the value of the address information AD is more than or equal to the start address and less than or equal to the end address of the memory cell. On the other hand, the address space assignment information ASA may include only the start address of each memory cell. In this case, the address comparison unit CP can calculate the end address from the start address and the capacity of the memory cell.

Figure 10:
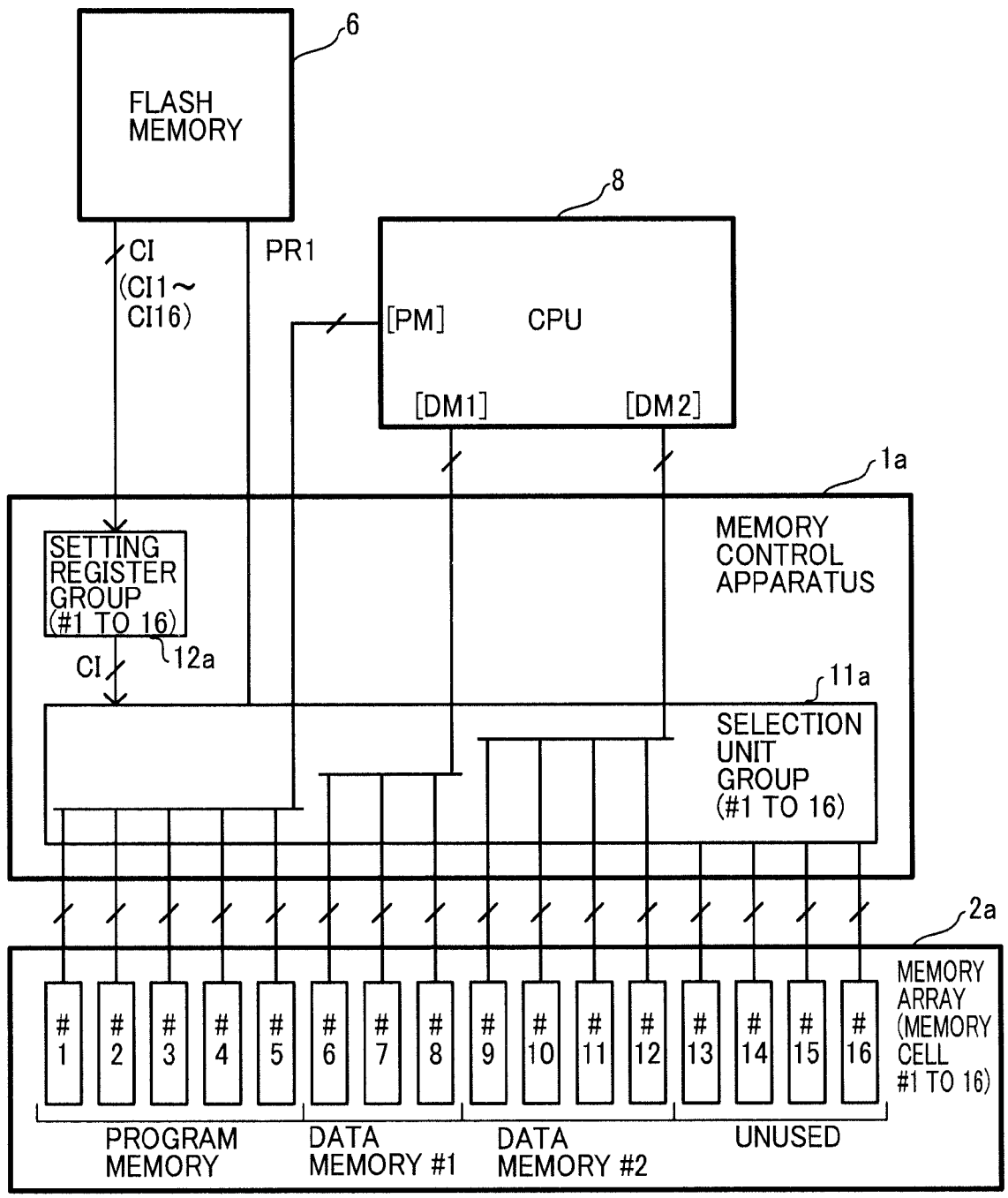
FIG. 10 is a diagram illustrating a connection relationship for memory cells which is determined in accordance with setting information illustrated in FIG. 9.

FIG. 10 illustrates a connection relationship for the memory cells which is determined in accordance with the setting information CI illustrated in FIG. 9. As described above, the CPU 8 starts execution of the program PR1 after the program PR1 is downloaded to the memory cells #1 to #5 which are assigned to the program memory. Therefore, the CPU 8, which has started the actual operation, can use each memory area as is the case with the individual memory as illustrated in FIG. 26.

As such, each of the selection units assigns the memory cell to each of the memory areas in accordance with the memory area selection information MAS, and assigns the address space of each memory area in accordance with the address space assignment information ASA. Also, in the memory cell assigned to the unused area, since the chip enable signal CEx, which is inputted from the selection circuit SL5 (first selection circuit), is fixed to the disable state, the sense amplifier circuit, the address decoder circuit and the like are not operated, and thus current consumption is reduced. At the same time, since the clock signal CK, which is inputted from the selection circuit SL6 (second selection circuit), is fixed to the low level, such elements as the clock buffer, the DFF, and the like are not operated, and thus the current consumption is further reduced.

In an embodiment of the present invention, instead of assignment of the memory cell to the unused area in the case of MAS=11, power-down assignment information PDA may be added to the setting information CI. For example, a configuration may be such that when the power-down assignment information PDA, which is a 1-bit value, is 1, the selection circuits SL1 to SL6 selects in the same manner as in the case of MAS=11. In this case, the setting information CI as illustrated in FIG. 11 is downloaded to each of the setting registers, so that the connection relationship for memory cells becomes such a relationship as illustrated in FIG. 10.

Second Embodiment

===Outline of Configuration of Memory Control Apparatus===

An outline of a configuration of a memory control apparatus according to a second embodiment of the present invention will be described below referring to FIG. 12.

Figure 12:
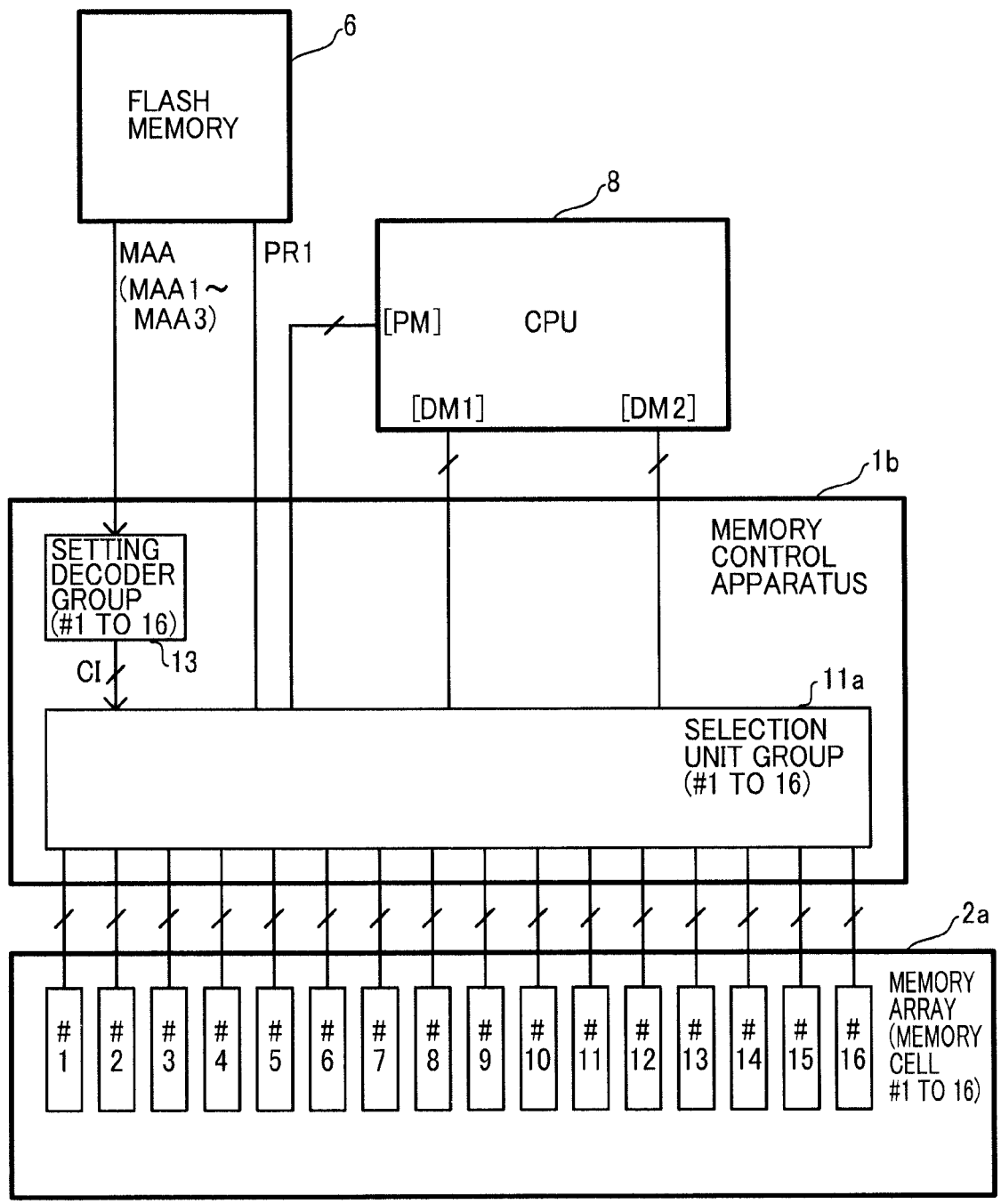
FIG. 12 is a block diagram illustrating an outline and an application example of a configuration of a memory control apparatus according to a second embodiment of the present invention.

A memory control apparatus 1b illustrated in FIG. 12 includes a setting decoder group 13 in place of the setting register group 12a with respect to the memory control apparatus 1a in a first embodiment of the present invention. In this embodiment of the present invention, the setting decoder group 13 corresponds to a plurality of setting output units and a plurality of setting information calculation units.

The setting decoder group 13 includes 16 setting decoders corresponding to the selection units and the memory cells, respectively, and hereinafter, each of the setting decoders is referred to as a setting decoder #1 (or #2 to #16) in association with each of the memory cells. Further, memory area assignment information MAA (MAA1 to MAA3) for assigning a capacity of each of the memory areas is inputted from the flash memory 6 to the setting decoder group 13, and the setting information CI is inputted from the setting decoder group 13 to the selection unit group 11a. The memory area assignment information MAA will be described later in detail.

===Outline of Operation of Memory Control Apparatus===

Subsequently, an outline of an operation of the memory control apparatus according to an embodiment of the present invention will be described.

In this embodiment of the present invention, the memory area assignment information MAA and the program PR1 are stored in the flash memory 6, and the memory area assignment information MAA is downloaded by a boot loader to each of the setting decoders before the CPU 8 starts the actual operation. Also, each of the setting decoders calculates the setting information CI from the memory area assignment information MAA, to be stores therein. Further, each of the selection units selects operation or stop of the operation of each of the memory cells, or selects a memory area to which each of the memory cells is assigned, in accordance with the setting information which is outputted from each of the setting decoders. Then, the boot loader downloads the program PR1 to the memory cell that is assigned to the program memory, and the CPU 8 starts executing the program PR1.

As described above, the selection unit group 11a selects operation of the memory cells and selects the memory area in accordance with the setting information CI which is calculated from the memory area assignment information MAA by the setting decoder group 13. Then, according to such selection, the CPU 8 can use the memory array 2a as the program memory, the data memory #1, and the data memory #2.

===Configuration of Selection Unit and Setting Decoder===

Figure 13:
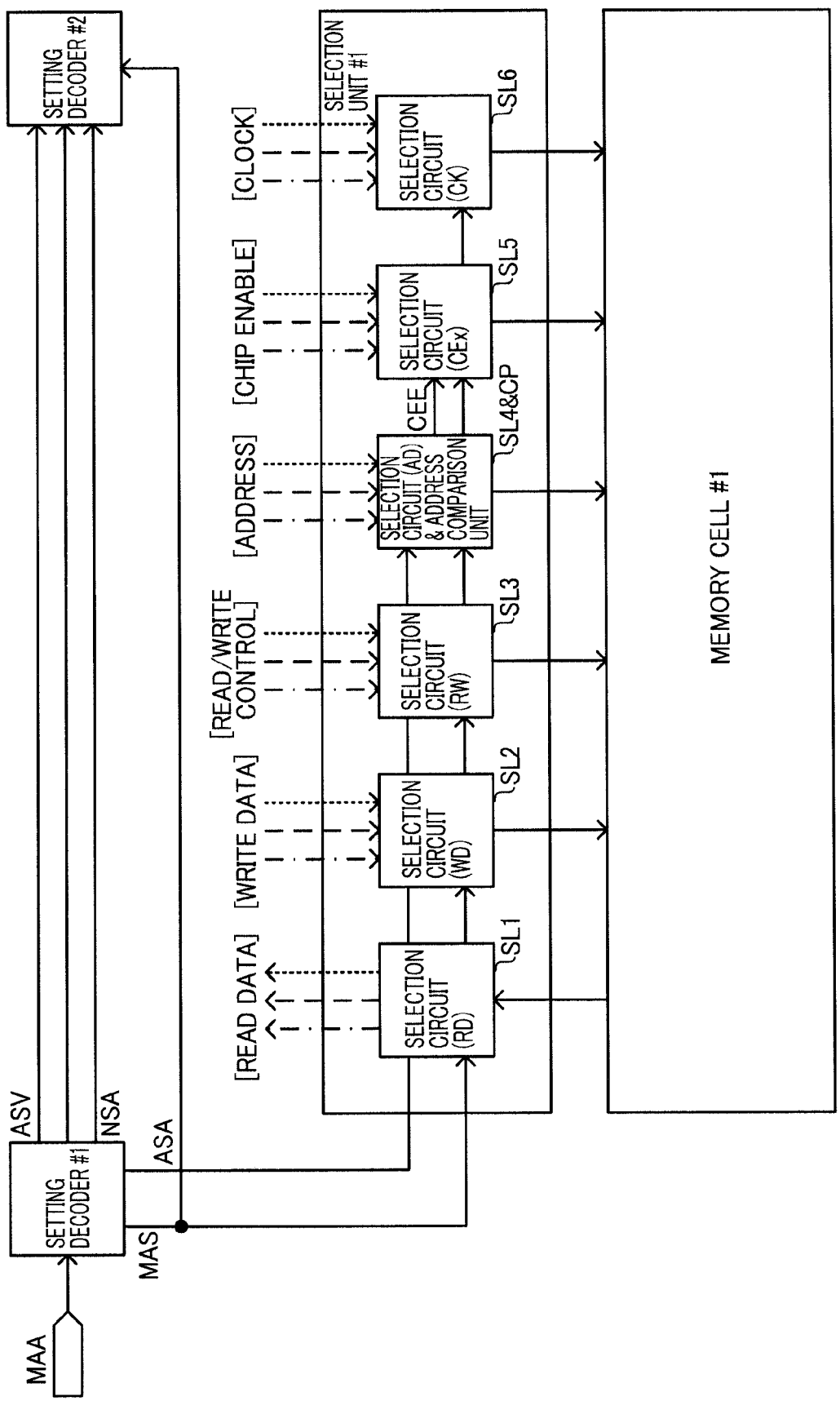
FIG. 13 is a block diagram illustrating configurations of a selection unit #1 corresponding to a memory cell #1 and a setting decoder #1 according to a second embodiment of the present invention.

In the memory control apparatus according to this embodiment of the present invention, the configurations of the selection unit #1 and the setting decoder #1 corresponding to the memory cell #1 will be described below referring to FIG. 13. It is assumed that the selection units have configurations similar to those thereof in a first embodiment of the present invention. FIG. 13 illustrates inputting from the setting decoder #1 to the setting decoder #2, and hereinafter it is assumed that the adjacent setting decoders have the similar relationship.

As illustrated in FIG. 13, the memory area assignment information MAA for assigning a capacity of each of the memory areas is inputted (downloaded) to the setting decoder #1. Also, similarly to a first embodiment of the present invention, the setting information CI1 includes the memory area selection information MAS and the address space assignment information ASA, and is inputted from the setting decoder #1 to the selection unit #1. An address subtraction value ASV and next cell start address information NSA, which will be described later, are also inputted from the setting decoder #1 to the setting decoder #2, in addition to the memory area assignment information MAA and the memory area selection information MAS.

The memory area assignment information MAA assigns the capacity of each memory area in a predetermined order, and in an embodiment of the present invention, the memory area assignment information MAA1 to MAA3 assigns the capacities of the program memory, the data memory #1, and the data memory #2 in this order. Also, in the following description, it is assumed, as an example, that the memory area assignment information MAA1 to MAA3, the address subtraction value ASV, and the next cell start address information NSA each have 16-bit values and are expressed in hexadecimal notation.

===Operation of Setting Decoder===

Subsequently, an operation of the setting decoder #1 in an embodiment of the present invention will be described.

Illustrated in FIG. 14 is an example of the memory area assignment information MAA to be downloaded to the setting decoder #1. As illustrated in FIG. 14, the capacities of the program memory, the data memory #1, and the data memory #2 which are specified by the memory area assignment information MAA are 5K words, 3K words, and 4K words, respectively.

A description will hereinafter be given of a method by which each of the setting decoders calculates the memory area selection information MAS and the address space assignment information ASA from the memory area assignment information MAA illustrated in FIG. 14 will be described, referring to FIG. 15. In each setting decoder, a memory cell capacity value indicating the memory cell capacity is set as an internal parameter. Also, in FIG. 15, similarly to FIG. 9, since the capacity of each of the memory cells is 1K word, each of the memory cell capacity values is set to 0x0400.

In the setting decoder #1, first, the value of the memory area selection information MAS is set to 00, assignment of the address space of the program memory is started, and the start address of the address space assignment information ASA is set to 0x0000. Also, the address subtraction value ASV is calculated by subtracting the memory cell capacity value from the value of the memory area assignment information MAA1 (0x1400−0x0400=0x1000). Further, the value of the next cell start address information NSA is calculated by adding the memory cell capacity value to 0 (0+0x0400=0x0400). Then, the end address of the address space assignment information ASA is a value (0x03FF) obtained by subtracting 1 from the value of the next cell start address information NSA.

In the setting decoder #2, the value (00) of the setting decoder #1 is set, as it is, to the value of the memory area selection information MAS, and the value (0x0400) of the next cell start address information NSA of the setting decoder #1 is set to the start address of the address space assignment information ASA. Also, the address subtraction value ASV is calculated by subtracting the memory cell capacity value from the value of the setting decoder #1 (0x1000−0x0400=0x0C00). Further, the value of the next cell start address information NSA is calculated by adding the memory cell capacity value to the value of the setting decoder #1 (0x0400+0x0400=0x0800). Then, the end address of the address space assignment information ASA is a value (0x07FF) obtained by subtracting 1 from the value of the next cell start address information NSA.

In the setting decoders #3 to #5 as well, calculation can be performed similarly to the case of the setting decoder #2. If the address subtraction value ASV becomes 0 or a negative value, the assignment of the address space of the present memory area is finished, and the assignment of the address space of the subsequent memory area is started. That is, in the setting decoder #5, since the address subtraction value ASV is 0, the assignment of the address space of the program memory is finished.

In the setting decoder #6, the value of the memory area selection information MAS is added by 1 and set to 01, the assignment of the address space of the data memory #1 is started, and the start address of the address space assignment information ASA is set to 0x0000. Also, the address subtraction value ASV is calculated by subtracting the memory cell capacity value from the value of the memory area assignment information MAA2 (0X0C00−0x0400=0X0800). Further, the value of the next cell start address information NSA is calculated by adding the memory cell capacity value to 0 (0+0x0400=0x0400). Then, the end address of the address space assignment information ASA is a value (0X03FF) obtained by subtracting 1 from the value of the next cell start address information NSA.

In the setting decoders #7 and #8 as well, calculation can be performed similarly to the case of the setting decoder #2. Since the address subtraction value ASV is 0 in the setting decoder #8, the assignment of the address space of the data memory #1 is finished.

In the setting decoder #9, the value of the memory area selection information MAS is added by 1 and set to 10, the assignment of the address space of the data memory #2 is started, and the start address of the address space assignment information ASA is set to 0x0000. Also, the address subtraction value ASV is calculated by subtracting the memory cell capacity value from the value of the memory area assignment information MAA3 (0X1000−0x0400=0X0C00). Further, the value of the next cell start address information NSA is calculated by adding the memory cell capacity value to 0 (0+0x0400=0x0400). Then, the end address of the address space assignment information ASA is a value (0X03FF) obtained by subtracting 1 from the value of the next cell start address information NSA.

In the setting decoders #10 to #12 as well, calculation can be performed similarly to the case of the setting decoder #2. Since the address subtraction value ASV is 0 in the setting decoder #12, the assignment of the address space of the data memory #2 is finished.

In the setting decoder #13, the value of the memory area selection information MAS is added by 1 and set to 11, and the memory cell #13 is assigned to the unused area. Also, in the setting decoder #13 and thereafter, by setting the value of the memory area selection information MAS to 11, the memory cell #13 and thereafter are all assigned to the unused area, and thus, there is no need to calculate the address subtraction value ASV and the like.

As illustrated in FIG. 15, the memory area selection information MAS and the address space assignment information ASA, which are calculated as such, are the same as those in FIG. 9. Therefore, the connection relationship for memory cells which is determined in accordance with the memory area assignment information MAA illustrated in FIG. 14 is resulted in such a relationship as illustrated in FIG. 10.

As described above, the setting decoders calculate the setting information CI from the memory area assignment information MAA, and the selection units assign the memory cells to the memory areas and also assign the address spaces of the memory areas in accordance with the setting information CI. Therefore, similarly to a first embodiment of the present invention, current consumption of the memory cell in the case where the cell is assigned to the unused area is reduced.

Since the memory area assignment information MAA to be downloaded to the setting decoder is smaller in size than the setting information, a time can be reduced which is required for the CPU 8 to start the actual operation in the memory control apparatus according to an embodiment of the present invention. On the other hand, since the setting register in a first embodiment of the present invention does not perform such a calculation as the setting decoder does, it can be reduced in circuit size than the setting decoder.

Third Embodiment

===Outline of Configuration of Memory Control Apparatus===

An outline of a configuration of a memory control apparatus according to a third embodiment of the present invention will be described below referring to FIG. 16.

Figure 16:
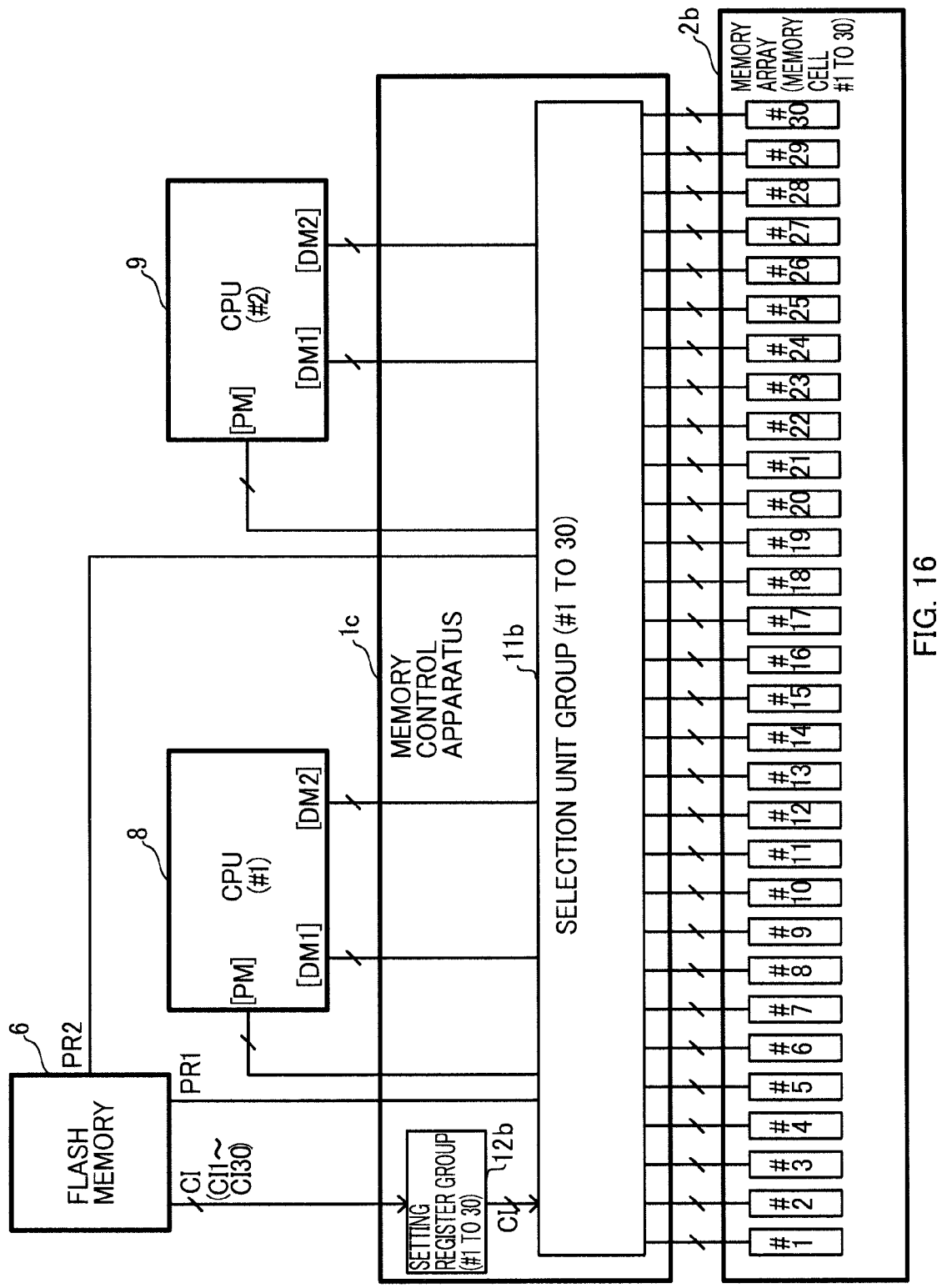
FIG. 16 is a block diagram illustrating an outline and an application example of a configuration of a memory control apparatus according to a third embodiment of the present invention.

A memory control apparatus 1c illustrated in FIG. 16 is an apparatus that controls a memory array 2b and includes a selection unit group 11b and a setting register group 12b. Also, FIG. 16 illustrates an application example of the memory control apparatus 1c, in which two CPUs 8 and 9 use the memory array 2b through the memory control apparatus 1c.

In this embodiment of the present invention, it is assumed, as an example, that the memory array 2b includes 30 memory cells. Also, the selection unit group 11b includes 30 selection units corresponding to the memory cells, respectively, and the setting register group 12b includes 30 setting registers corresponding to the selection units and the memory cells, respectively.

The CPUs 8 and 9 use three memory areas corresponding to the program memory, the data memory #1, and the data memory #2, respectively. Also, the flash memory 6 is connected to the selection unit group 11b and the setting register group 12b.

===Outline of Operation of Memory Control Apparatus===

Subsequently, an outline of an operation of the memory control apparatus according to this embodiment of the present invention will be described.

In this embodiment of the present invention, the setting information CI, the programs PR1 and PR2 are stored in the flash memory 6, and the setting information CI is downloaded by a boot loader to each of the setting registers and stored therein before the CPUs 8 and 9 start the actual operation. Also, each of the selection units selects operation or stop of the operation of each of the memory cells, or selects a memory area to which each of the memory cells is assigned, in accordance with the setting information stored in each of the setting registers. Further, the boot loader downloads the program PR1 to the memory cell that is assigned to the program memory for CPU 8, and downloads the program PR2 to the memory cell that is assigned to the program memory for CPU 9. Then, the CPUs 8 and 9 start executing the programs PR1 and PR2, respectively.

As described above, the selection unit group 11b selects operation of the memory cells and selects the memory area in accordance with the setting information CI stored in the setting register group 12b. Then, according to such selection, the CPUs 8 and 9 can use the memory array 2b independently as the program memory, the data memory #1, and the data memory #2.

===Configuration of Selection Unit===

In this embodiment of the present invention, CPU assignment information CPA, which is a 1-bit value, is added to the setting information CI. Therefore, the CPU assignment information CPA, the memory area selection information MAS, and the address space assignment information ASA are inputted from each of the setting registers to each of the selection units. Further, signals respectively corresponding to the program memory, the data memory #1, and the data memory #2, which are inputted/outputted with respect to the CPU 9, are added to each of the selection units of the selection unit group 11b, in addition to the signals in the case of the selection units in a first embodiment of the present invention.

Figure 17:
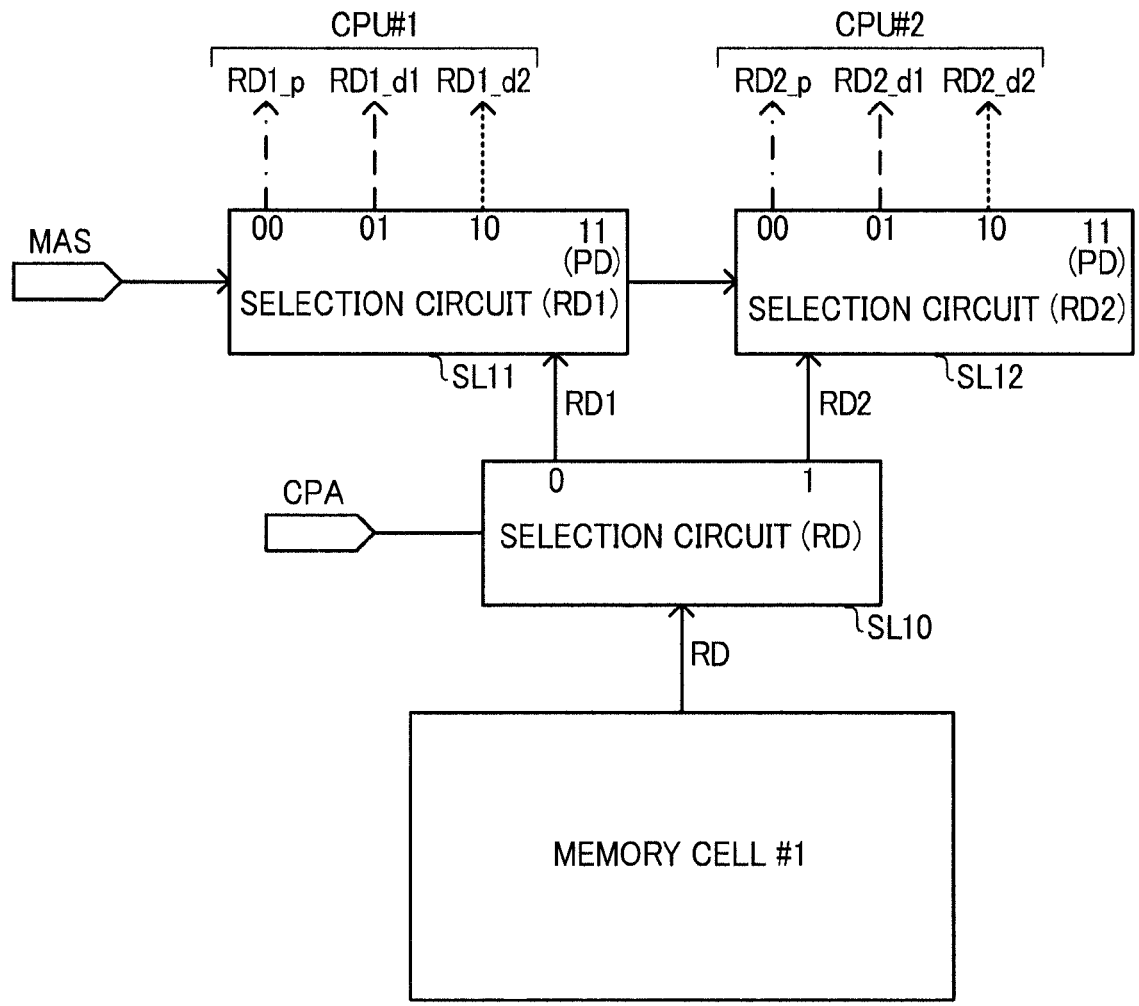
FIG. 17 is a block diagram illustrating an example of a specific configuration of a selection circuit corresponding to read data according to a third embodiment of the present invention.
Figure 18:
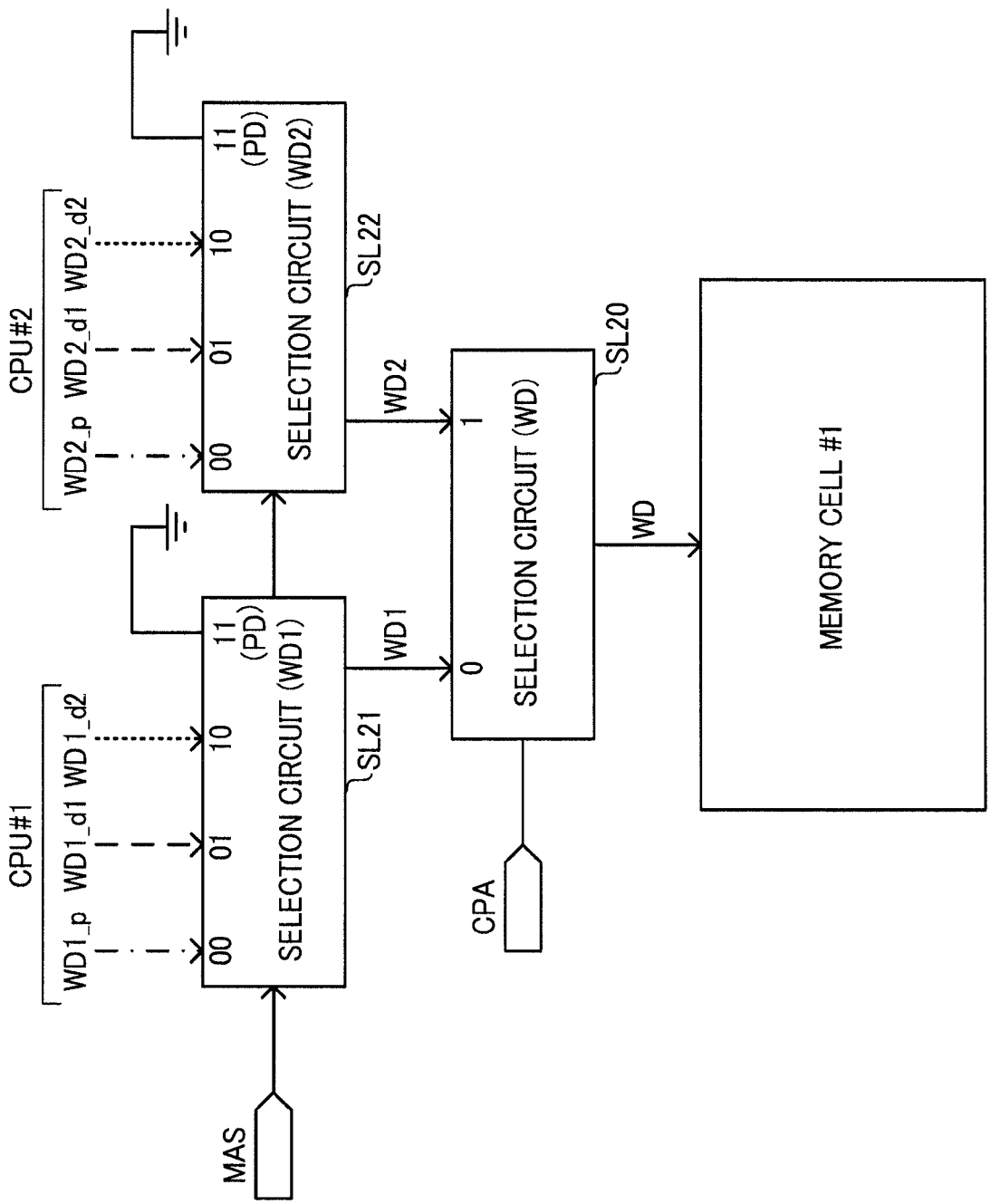
FIG. 18 is a block diagram illustrating an example of a specific configuration of a selection circuit corresponding to write data according to a third embodiment of the present invention.

Here, illustrated in FIGS. 17 and 18, respectively, are examples of specific configurations of selection circuits corresponding to the read data and the write data in the selection unit #1 corresponding to the memory cell #1 in this embodiment of the present invention. In FIGS. 17 and 18, signals corresponding to the CPUs #1 and #2 are expressed with "1" and "2" added to the signals inputted/outputted with respect to the memory cell #1, respectively. Further, similarly to FIGS. 3 to 8, the signals corresponding to the program memory, the data memory #1, and the data memory #2 are expressed with "_p", "_d1", and "_d2" added thereto, respectively. The CPUs 8 and 9 in FIG. 16 correspond to the CPUs #1 and #2, respectively.

As illustrated in FIG. 17, the selection circuit corresponding to the read data includes the selection circuits SL10 to SL12.

The selection circuit SL10 is configured as a demultiplexer with one input and two outputs, and the CPU assignment information CPA is inputted to a selection control input thereof. Also read data RD is inputted from the memory cell #1 to a data input thereof. Further, the read data RD1 and RD2 are outputted from the outputs corresponding to CPA=0 and CPA=1, respectively.

The selection circuits SL11 and SL 12 are both configured similarly to the selection circuit SL1 illustrated in FIG. 3, and the read data RD1 and RD2 are inputted to the data inputs thereof, respectively. And the read data RD1_p, RD1_d1, and RD1_d2 outputted from the selection circuit SL11 are inputted to the CPU #1 as read data of the program memory, the data memory #1, and the data memory #2, respectively. On the other hand, the read data RD2_p, RD2_d1, and RD2_d2 outputted from the selection circuit SL12 are inputted to the CPU #2 as read data of the program memory, the data memory #1, and the data memory #2, respectively.

As illustrated in FIG. 18, the selection circuit corresponding to the write data includes the selection circuits SL20 to SL22.

The selection circuits SL21 and SL22 are both configured similarly to the selection circuit SL2 illustrated in FIG. 4. Also, the write data WD1_p, WD1_d1, and WD1_d2 are inputted to the data inputs of the selection circuit SL21, respectively, and the write data WD2_p, WD2_d1, and WD2_d2 are inputted to the data inputs of the selection circuit SL22, respectively. And the write data WD1 and WD2 outputted from the selection circuits SL21 and SL22, respectively, are both inputted to the data inputs of the selection circuit SL20.

The selection circuit SL20 is configured as a multiplexer having two inputs and one output, and the CPU assignment information CPA is inputted to the selection control input thereof. Also, the write data WD1 and WD2 are inputted to the data inputs corresponding to CPA=0 and CPA=1, respectively. And the write data WD outputted from the selection circuit SL20 is inputted to the memory cell #1.

Similarly, the selection circuits corresponding to the read/write control signal, the address information, the chip enable signal, and the clock signal each can also be configured with a multiplexer with two inputs and one output similarly to the selection circuit SL20 and two multiplexers each with four inputs and one output similarly to a first embodiment of the present invention.

===Operation of Selection Unit===

Subsequently, an operation of the selection unit #1 according to this embodiment of the present invention will be described.

As illustrated in FIGS. 17 and 18, in this embodiment of the present invention, the CPU assignment information CPA is inputted to all the selection control inputs of the selection circuits which are directly connected to the memory cell #1. Thus, descriptions will be separately given according to a value of the CPU assignment information CPA in the following.

In a case of CPA=0, in FIG. 17, for example, the selection circuit SL11 is connected to the memory cell #1 through the selection circuit SL10, and the read data RD outputted from the memory cell #1 can be inputted only to the CPU #1. Similarly, as for the selection circuits corresponding to other signals, the selection circuit, which is similar to that in a first embodiment of the present invention and is connected to the CPU #1, is connected to the memory cell #1 through the selection circuit similar to the selection circuit SL20. Therefore, the selection unit #1 assigns the memory cell #1 to the memory area for CPU #1 (including the unused area) in accordance with the memory area selection information MAS.

In a case of CPA=1, in FIG. 17, for example, the selection circuit SL12 is connected to the memory cell #1 through the selection circuit SL10, and the read data RD outputted from the memory cell #1 can be inputted only to the CPU #2. Similarly, as for the selection circuits corresponding to the other signals, the selection circuit, which is similar to that in a first embodiment of the present invention and is connected to the CPU #2, is connected to the memory cell #1 through the selection circuit similar to the selection circuit SL20. Therefore, the selection unit #1 assigns the memory cell #1 to the memory area for CPU #2 (including the unused area) in accordance with the memory area selection information MAS.

===Example of Setting Information===

Here, an example of the setting information CI to be downloaded to the setting registers #1 to #30 is illustrated in FIG. 19.

The CPU assignment information CPA is used for selecting either one of the CPUs #1 and #2 in each of the selection units. Also, the memory area selection information MAS is used for selecting a memory area in the CPU #1 or #2 to which the memory cell is to be assigned.

As illustrated in FIG. 19, in accordance with the CPU assignment information CPA and the memory area selection information MAS, the memory cells #1 to #5 are assigned to the program memory for CPU #1. Also, the memory cells #6 to #8 are assigned to the data memory #1 for CPU #1, and the memory cells #9 to #12 are assigned to the data memory #2 for CPU #1.

On the other hand, the memory cells #19 to #23 are assigned to the program memory for CPU #2. Also, the memory cells #24 to #26 are assigned to the data memory #1 for CPU #2, and the memory cells #27 to #30 are assigned to the data memory #2 for CPU #2.

The address space assignment information ASA is used for assigning the address space of each of the memory areas other than the unused area. As illustrated in FIG. 19, the address space is assigned in accordance with the address space assignment information ASA, and the capacities of the program memory, the data memory #1, and the data memory #2 for CPU #1 are set to 5K words, 3K words, and 4K words, respectively. Similarly, the capacities of the program memory, the data memory #1, and the data memory #2 for CPU #2 are also set to 5K words, 3K words, and 4K words, respectively.

The memory cells #13 to #18 are assigned to the unused area in accordance with the memory area selection information MAS, and the CPU assignment information CPA and the address space assignment information ASA corresponding to these memory cells are not used.

Figure 20:
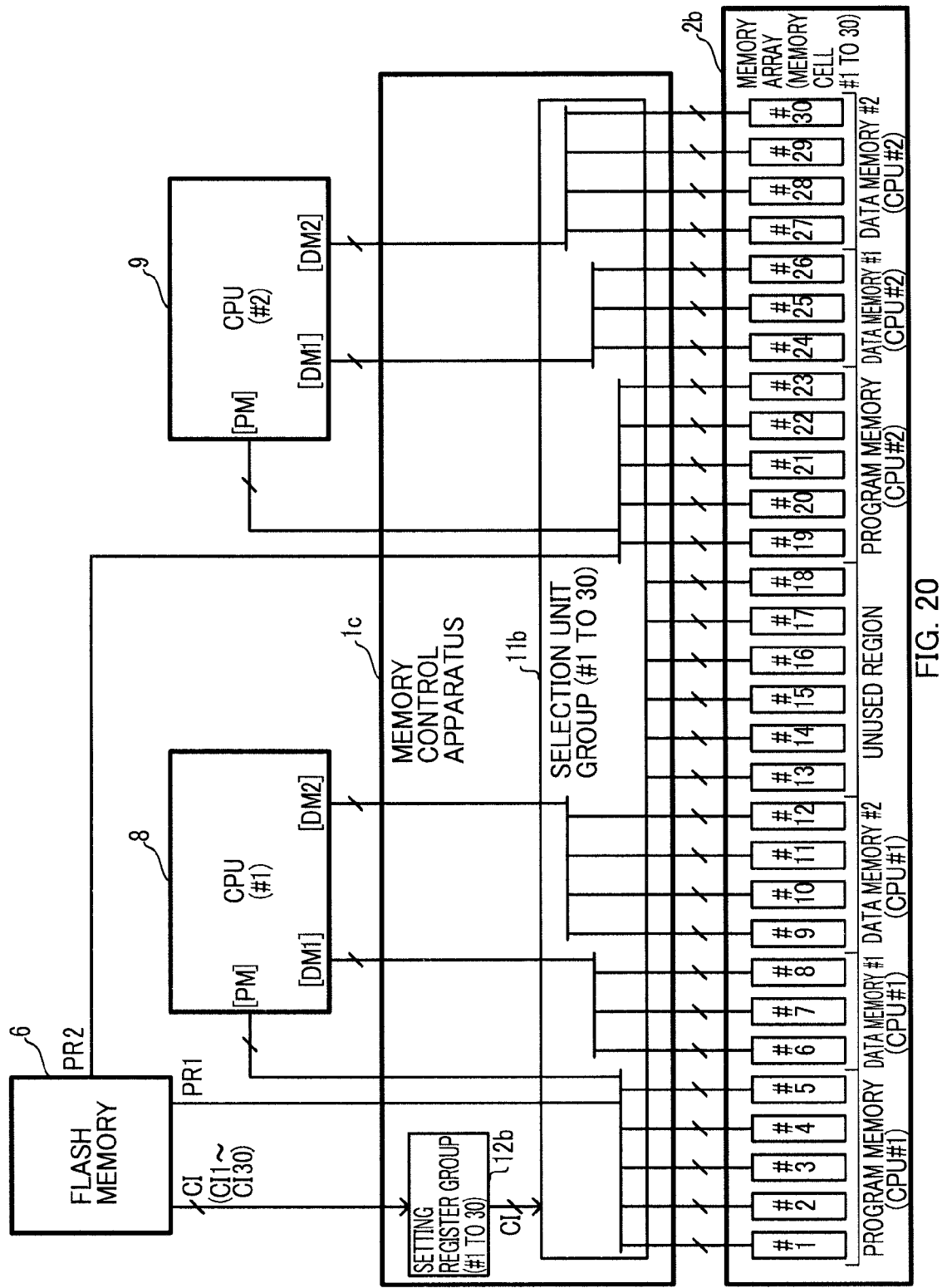
FIG. 20 is a diagram illustrating a connection relationship for memory cells which is determined in accordance with setting information illustrated in FIG. 19.

FIG. 20 illustrates a connection relationship for memory cells which is determined in accordance with the setting information CI illustrated in FIG. 19. As described above, the CPU 8 starts execution of the program PR1, after the program PR1 is downloaded to the memory cells #1 to #5 which are assigned to the program memory. Also, the CPU 9 starts execution of the program PR2 after the program PR2 is downloaded to the memory cells #19 to #23 which are assigned to the program memory. Therefore, the CPUs 8 and 9, which have started the actual operation, can use each memory area as is the case with the individual memory as illustrated in FIG. 26.

As such, each of the selection units assigns the memory cell to each of the memory areas of the CPU #1 or #2 in accordance with the CPU assignment information CPA and the memory area selection information MAS, and assigns the address space of each memory area in accordance with the address space assignment information ASA. Therefore, similarly to first and second embodiments of the present invention, the current consumption of the memory cell assigned to the unused area is reduced.

In this embodiment of the present invention, in place of the setting register, the setting decoder may be used similarly to a second embodiment of the present invention.

Fourth Embodiment

===Outline of Configuration of Memory Control Apparatus===

An outline of a configuration of a memory control apparatus according to a fourth embodiment of the present invention will be described below referring to FIG. 21.

Figure 21:
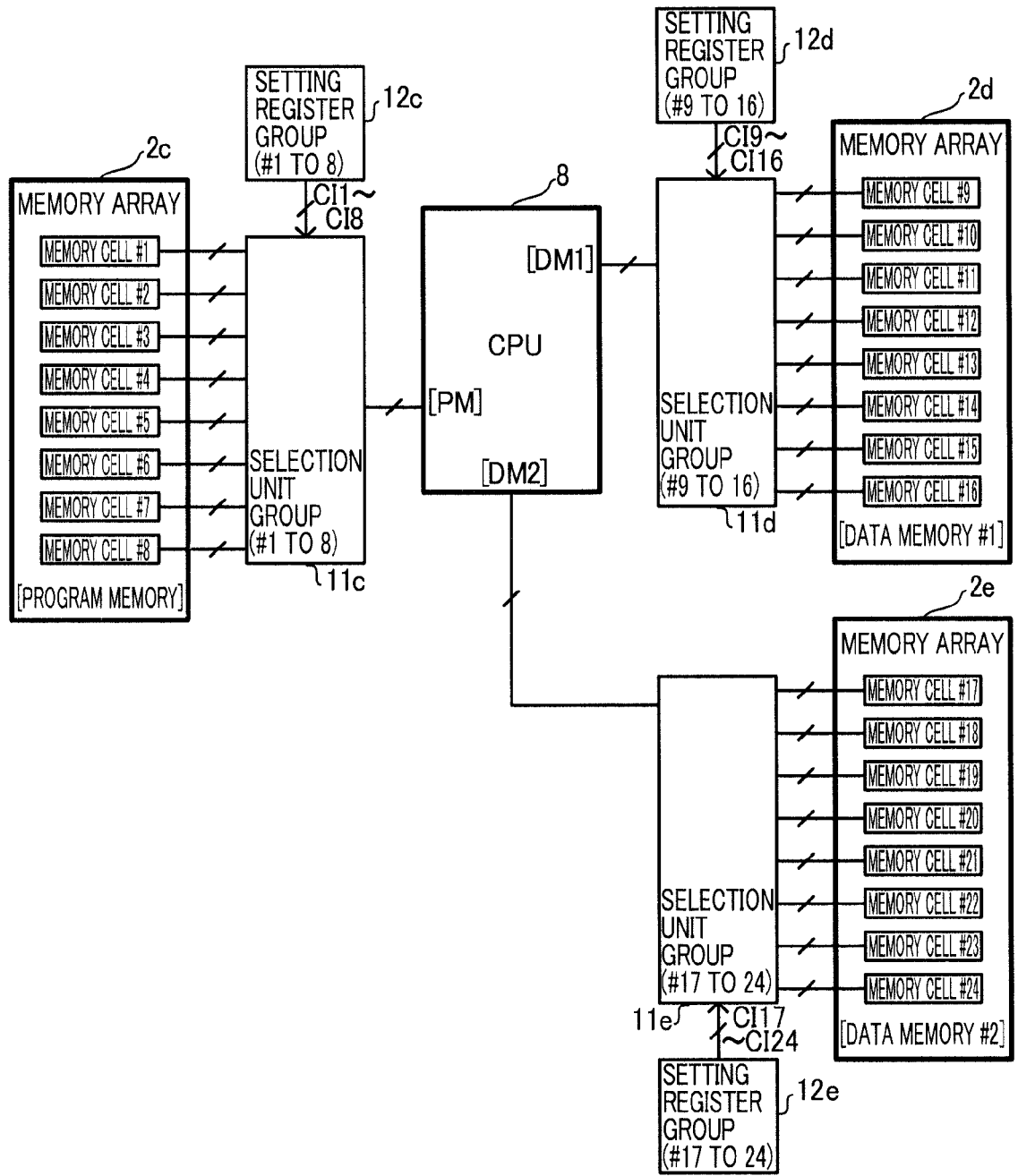
FIG. 21 is a block diagram illustrating an outline and an application example of a configuration of a memory control apparatus according to a fourth embodiment of the present invention.

The memory control apparatus illustrated in FIG. 21 is an apparatus that controls memory arrays 2c to 2e and includes selection unit groups 11c to 11e and setting register groups 12c to 12e. In FIG. 21, the flash memory in which the setting information and the program are stored is not illustrated, but it is assumed to be used similarly to first to third embodiments.

In this embodiment of the present invention, as an example, it is assumed that the memory arrays 2c to 2e each include 8 memory cells. Also, the selection unit groups 11c to 11e include 24 selection units corresponding to the memory cells, respectively, and the setting register groups 12c to 12e include 24 setting registers corresponding to the selection units and the memory cells, respectively.

The CPU 8 uses the memory arrays 2c to 2e only as memory areas corresponding to the program memory, the data memory #1, and the data memory #2, respectively.

===Outline of Operation of Memory Control Apparatus===

Subsequently, an outline of an operation of the memory control apparatus according to an embodiment of the present invention will be described.

Similarly to a first embodiment of the present invention, in each of the setting registers, the setting information CI is downloaded and stored therein before the CPU 8 starts an actual operation. Also, each of the selection units selects operation or stop of the operation of each of the memory cells in accordance with the setting information stored in each of the setting registers. In this embodiment of the present invention, the memory arrays 2c to 2e are exclusive to the program memory, the data memory #1, and the data memory #2, respectively, and thus, there is no need to assign the memory cell to each memory area in accordance with the setting information CI.

And in the memory array 2c to be used only as the program memory, the program is downloaded to a memory cell which is usable, and the CPU 8 starts the execution of the program.

As described above, the selection unit groups 11c to 11e select operation of the memory cells in accordance with the setting information CI stored in the selection unit groups 11c to 11e. Then, according to such selection, the CPU 8 can use memory cells which are usable in the memory arrays 2c to 2e as the program memory, the data memory #1, and the data memory #2, respectively.

In this embodiment of the present invention, the memory arrays 2c to 2e do not have to be separate from one another. For example, the 24 pieces of memory cells included in one memory array may be divided into 3 groups of 8 pieces, the 3 groups may be used exclusively to the program memory, the data memory #1, and the data memory #2, respectively. Similarly, the selection unit groups 11c to 11e and the setting register groups 12c to 12e may be configured as a single selection unit group and a single setting register group, respectively.

===Configuration of Selection Unit===

In this embodiment of the present invention, the setting information CI includes the power-down assignment information PDA illustrated in FIG. 11 and the address space assignment information ASA, and is inputted from the setting registers to the selection units.

Figure 22:
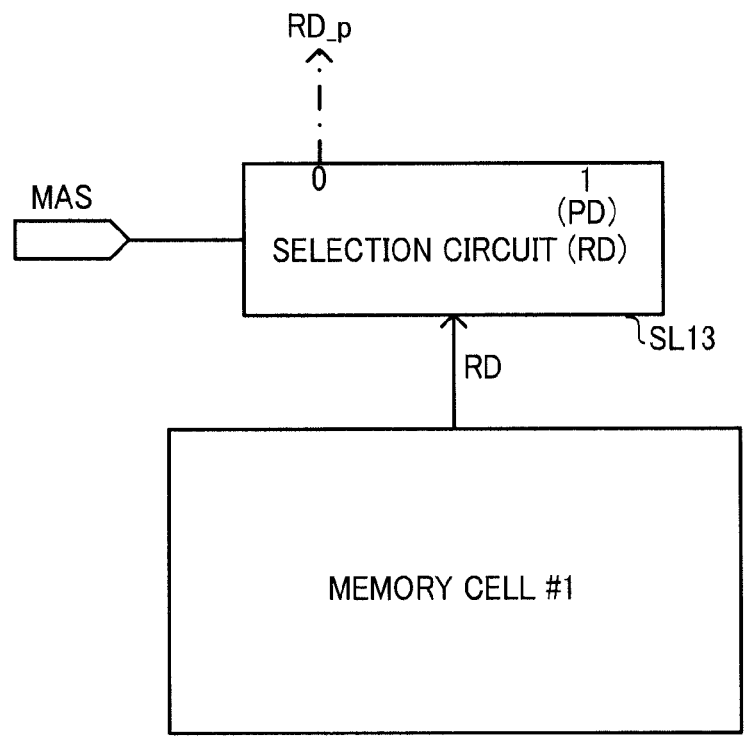
FIG. 22 is a block diagram illustrating an example of a specific configuration of a selection circuit corresponding to read data according to a fourth embodiment of the present invention.
Figure 23:
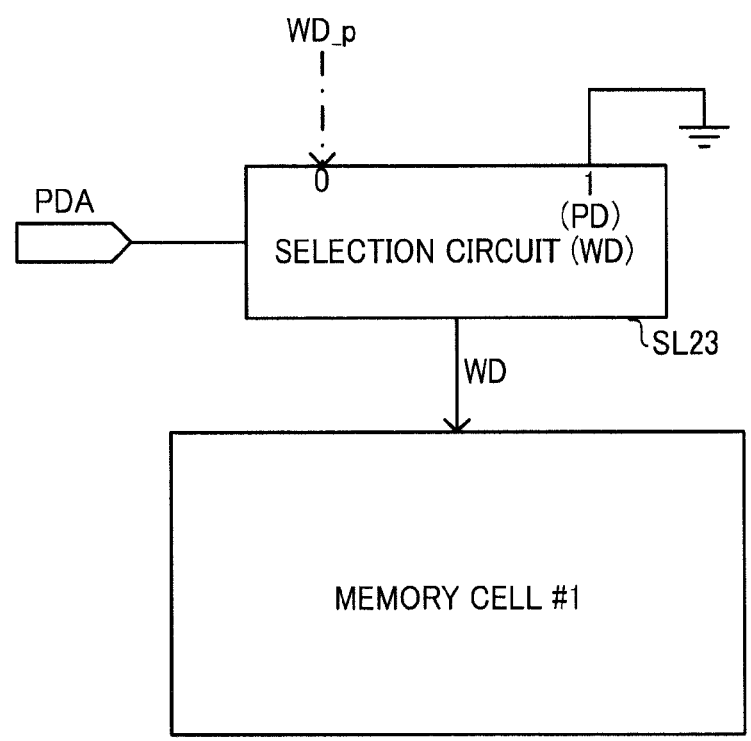
FIG. 23 is a block diagram illustrating an example of a specific configuration of a selection circuit corresponding to write data according to a fourth embodiment of the present invention.

Here, illustrated in FIGS. 22 and 23, respectively are examples of specific configurations of the selection circuits corresponding to the read data and the write data in the selection unit #1 corresponding to the memory cell #1 according to this embodiment of the present invention.

As illustrated in FIG. 22, the selection circuit SL13 corresponding to the read data is configured as a demultiplexer with one input and two outputs, and the power-down assignment information PDA is inputted to the selection control input thereof. Also, the read data RD is inputted from the memory cell #1 to the data input. Further, the read data RD_p is outputted from the output corresponding to PDA=0, and the output corresponding to PDA=1 is NC. And the read data RD_p is inputted to the CPU 8 as the read data of the program memory.

As illustrated in FIG. 23, the selection circuit SL23 corresponding to the write data is configured as a multiplexer with two inputs and one output, and the power-down assignment information PDA is inputted to the selection control input thereof. Also, the write data WD_p is inputted to the data input corresponding to PDA=0, and the data input corresponding to PDA=1 is fixed to a low level. The write data WD outputted from the selection circuit SL 23 is inputted to the memory cell #1.

Similarly, the selection circuits corresponding to the read/write control signal, the address information, the chip enable signal, and the clock signal each can also be configured as a multiplexer with two inputs and one output similarly to the selection circuit SL23. Also, the power-down assignment information PDA is inputted to the selection control input of the multiplexer. The data input corresponding to PDA=1 is processed in the selection circuits SL3 to SL6 illustrated in FIGS. 5 to 8, respectively, similarly to the data input corresponding to MAS=11.

===Operation of Selection Unit===

Subsequently, an operation of the selection unit #1 in this embodiment of the present invention will be described.

As illustrated in FIGS. 22 and 23, in this embodiment of the present invention, the power-down assignment information PDA is inputted to the selection control input of each of the selection circuits. Thus, descriptions will be separately given according to a value of the power-down assignment information PDA in the following.

In a case of PDA=0, the selection unit #1 operates the memory cell #1. Specifically, the read data RD inputted from the memory cell #1 to the selection circuit SL13 is inputted to the CPU 8 as the read data RD_p of the program memory. Also, the write data WD_p, the read/write control signal RW_p, the address information AD_p, the chip enable signal CEx_p, and the clock signal CK_p of the program memory are inputted to the memory cell #1.

In a case of PDA=1, the selection unit #1 stops the operation of the memory cell #1. Specifically, the read data RD which is inputted from the memory cell #1 to the selection circuit SL13 is not inputted to the CPU 8, and the write data WD which is inputted to the memory cell #1 is fixed to the low level. Also, the read/write control signal which is inputted to the memory cell #1 is fixed to the reading mode, and the value of the address information AD is fixed to 0. Further, since the chip enable signal CEx inputted to the memory cell #1 is fixed to a disable state, and the clock signal CK which is inputted to the memory cell #1 is fixed to the low level, the current consumption of the memory cell #1 is drastically reduced.

===Example of Setting Information===

Here, an example of the setting information CI to be downloaded to the setting registers #1 to #24 is illustrated in FIG. 24.

The power-down assignment information PDA is used for selecting operation or stop of the operation of each of the memory cells in each of the selection units. As illustrated in FIG. 24, in accordance with the power-down assignment information PDA, the memory cells #1 to #5, #9 to #11, and #17 to #20 are usable. The memory cells #6 to #8, #12 to #16, and #21 to #24 are to be unused, whereby the current consumption is reduced.

The address space assignment information ASA is used for assigning the address space of the usable area, respectively, in the memory arrays 2c to 2e. As illustrated in FIG. 24, the address space is assigned in accordance with the address space assignment information ASA, and the capacities of the program memory, the data memory #1, and data memory #2 are 5K words, 3K words, and 4K words, respectively. Also, the address space assignment information ASA corresponding to the memory cells #6 to #8, #12 to #16, and #21 to #24 which are to be unused is not used.

Figure 25:
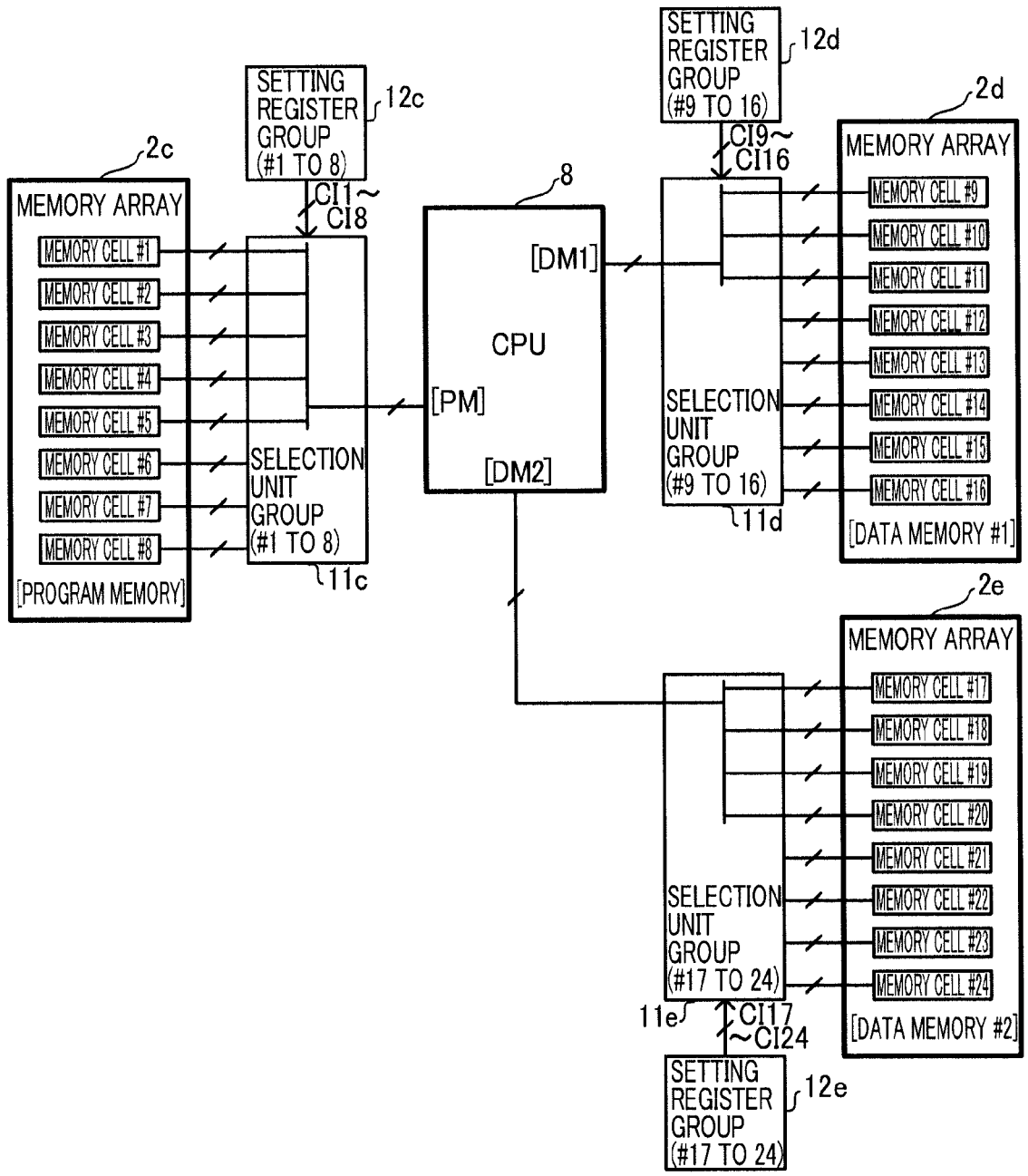
FIG. 25 is a diagram illustrating a connection relationship for memory cells which is determined in accordance with setting information illustrated in FIG. 24.

FIG. 25 illustrates a connection relationship for the memory cells which is determined in accordance with the setting information CI illustrated in FIG. 24. As described above, the CPU 8 starts execution of the program, after the program is downloaded to the memory cells #1 to #5 which are usable as the program memory. Therefore, the CPU 8, which has started the actual operation, can use the memory arrays 2c to 2e as is the case with the individual memory as illustrated in FIG. 26.

As such, each of the selection units selects operation or stop of the operation of each of the memory cells in accordance with the power-down assignment information PDA and assigns the address space of the usable area in accordance with the address space assignment information ASA. Therefore, the current consumption of the memory cell which is to be unused can be reduced similarly to first and third embodiments of the present invention.

In this embodiment of the present invention, in place of the setting register, the setting decoder may be used similarly to a second embodiment of the present invention.

Also, in the memory control apparatus according to this embodiment of the present invention, since the number of inputs of the multiplexer and the number of outputs of the demultiplexer are smaller than those in the memory control apparatus in a first embodiment of the present invention, an operation speed can be kept at a high speed. On the other hand, in the memory control apparatus according to a first embodiment of the present invention, if all the memory capacities are the same, each of the program memory, the data memory #1, and the data memory #2 has a large changeable portion in each of the capacities thereof, and thus the configuration has high general versatility.

As described above, since selection is made between operation and stop of the operation of each of the plurality of memory cells in accordance with the setting information CI, the current consumption of the memory having an unused area can be reduced.

Further, since the chip enable signal CEx of the memory cell which is assigned to the unused area is fixed to the disable state, the operation of the sense amplifier circuit, the address decoder circuit and the like can be stopped, so that, the current consumption can be reduced.

Furthermore, since the clock signal CK of the memory cell which is assigned to the unused area is fixed to the low level, the operations of the elements such as the clock buffer, the DFF, and the like are stopped, so that the current consumption can be reduced.

Still furthermore, since the memory area, to which the memory cell is assigned, is selected in accordance with the memory area selection information MAS, each of the program memory, the data memory #1, and the data memory #2 has a large changeable portion in each of the capacities thereof, so that the configuration has high general versatility.

Still furthermore, since the setting information CI is downloaded to each of the setting registers, the memory control apparatus can be reduced in size.

Still furthermore, since the setting decoder calculates the setting information CI from the memory area assignment information MAA, the time can be reduce which is required for the CPU to start the actual operation.

In embodiments of the present invention described above, a configuration is such that the memory cells are connected in parallel with the selection unit group, but this is not limitative. For example, a hierarchical structure may be employed in which a memory control apparatus is further provided in the memory cell for which operation or stop of the operation is selected by the memory control apparatus. With such a hierarchical structure, the unused areas can be controlled more finely, so that the current consumption can be further reduced.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A memory control apparatus comprising:
a plurality of setting output units each configured to output setting information for setting operation of each of a plurality of memory cells included in a memory array; and
a plurality of selection units each configured to:
select a memory area, from among a plurality of memory areas corresponding to program memory and data memory, to which each of the plurality of memory cells included in the memory array is assigned in accordance with the setting information, and
stop the operation of a memory cell, from among the plurality of memory cells included in the memory array, that is not assigned to any of the plurality of memory areas;
wherein the plurality of selections units include a plurality of first selection circuits, respectively, each of the plurality of first selection circuits configured to select supply or stop of the supply of a clock signal to each of the plurality of memory cells included in the memory array in accordance with the setting information; and
for a memory cell, whose operation is to be stopped, of the plurality of memory cells included in the memory array, a first selection circuit of the plurality of first selection circuits stops the supply of the clock signal to the memory cell.

2. The memory control apparatus according to claim 1, wherein
the plurality of selection units include a plurality of second selection circuits, respectively, each of the plurality of second selection circuits configured to select a logic level of a chip enable signal inputted to each of the plurality of memory cells included in the memory array, in accordance with the setting information; and for a memory cell, whose operation is to be stopped, of the plurality of memory cells included in the memory array, a second selection circuit of the plurality of second selection circuits disables the chip enable signal inputted to the memory cell.

3. The memory control apparatus according to claim 2, wherein the plurality of setting output units include a plurality of storage units each configured to be inputted with the setting information to be stored therein, respectively.

4. The memory control apparatus according to claim 2, wherein the plurality of setting output units include a plurality of setting information calculation units, respectively, each of the plurality of setting information calculation units configured to be inputted with area assignment information for assigning capacity of each of the plurality of memory areas and calculate the setting information from the area assignment information.

5. The memory control apparatus according to claim 1, wherein the plurality of setting output units include a plurality of storage units each configured to be inputted with the setting information to be stored therein, respectively.

6. The memory control apparatus according to claim 1, wherein the plurality of setting output units include a plurality of setting information calculation units, respectively, each of the plurality of setting information calculation units configured to be inputted with area assignment information for assigning capacity of each of the plurality of memory areas and calculate the setting information from the area assignment information.

\* \* \* \* \*